(12) United States Patent
Shroff Rama et al.

(10) Patent No.: US 10,815,420 B2
(45) Date of Patent: Oct. 27, 2020

(54) PROPPANT COMPRISING A CROSSLINKED POLYMER FOR TREATMENT OF SUBTERRANEAN FORMATIONS

(71) Applicant: Halliburton Energy Services, Inc., Houston, TX (US)

(72) Inventors: Mallikarjuna Shroff Rama, Pune (IN); Sairam Eluru, Pune (IN); Monica Dandawate, Pune (IN); Phillip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/757,358

(22) PCT Filed: Sep. 23, 2015

(86) PCT No.: PCT/US2015/051715
§ 371 (c)(1),
(2) Date: Mar. 3, 2018

(87) PCT Pub. No.: WO2017/052533
PCT Pub. Date: Mar. 30, 2017

(65) Prior Publication Data
US 2019/0023977 A1    Jan. 24, 2019

(51) Int. Cl.
*C09K 8/80* (2006.01)
*E21B 43/267* (2006.01)
*C09K 8/62* (2006.01)
*C08L 79/08* (2006.01)

(52) U.S. Cl.
CPC .............. *C09K 8/80* (2013.01); *C08L 79/08* (2013.01); *C09K 8/62* (2013.01); *E21B 43/267* (2013.01); *C08L 2312/00* (2013.01)

(58) Field of Classification Search
CPC combination set(s) only.
See application file for complete search history.

(56) References Cited

U.S. PATENT DOCUMENTS

| | | | |
|---|---|---|---|
| 6,235,803 B1 | 5/2001 | Weiser et al. | |
| 8,404,278 B2 | 3/2013 | Albrecht et al. | |
| 9,765,256 B2 * | 9/2017 | Afanasiev | C08F 132/06 |
| 10,266,756 B2 * | 4/2019 | Eluru | C09K 8/80 |
| 2002/0048676 A1 | 4/2002 | Mcdaniel et al. | |
| 2007/0209795 A1 * | 9/2007 | Gupta | C09K 8/80 |
| | | | 166/278 |

(Continued)

FOREIGN PATENT DOCUMENTS

| | | |
|---|---|---|
| WO | 2007042939 A1 | 4/2007 |
| WO | 2017052522 A1 | 3/2017 |

OTHER PUBLICATIONS

PCT International Search Report and Written Opinion dated Nov. 26, 2015 issued in corresponding application No. PCT/US2015/051715 filed on Sep. 23, 2015, 15 pgs.

(Continued)

*Primary Examiner* — Angela M DiTrani Leff
(74) *Attorney, Agent, or Firm* — Chamberlain Hrdlicka

(57) ABSTRACT

Proppants comprise crosslinked polymers for treatment of subterranean formations. The proppants may have a particle size less than or equal to 100 microns. A method of treating a subterranean formation includes placing a proppant including a crosslinked polymer in the subterranean formation. The placing may include placing the proppant in secondary fractures. Placing the proppant may avoid the closure of the secondary fractures.

20 Claims, 7 Drawing Sheets

(56) References Cited

U.S. PATENT DOCUMENTS

| | | |
|---|---|---|
| 2008/0302570 A1 | 12/2008 | Deboer |
| 2009/0151944 A1 | 6/2009 | Fuller et al. |
| 2012/0018162 A1* | 1/2012 | Tanguay ............... C09K 8/62 166/308.1 |
| 2014/0060826 A1* | 3/2014 | Nguyen ............... E21B 43/267 166/280.1 |
| 2016/0326300 A1* | 11/2016 | Gelves .................. C09K 8/80 |
| 2018/0030336 A1* | 2/2018 | Eluru .................... C09K 8/80 |

OTHER PUBLICATIONS

Mary Ann B. Meador et al., Polyimide Aerogels with Amide Cross-Links: A Low Cost Alternative or Mechanically Strong Polymer Aerogels, ACS Applied Materials & Interfaces, Jan. 7, 2015, p. 1240-1249.

Mary Ann B. Meador et al, Mechanically Strong, Flexible Polyimide Aerogels Cross-Linked with Aromatic Triamine, ACS Applied Materials & Interfaces, Jan. 10, 2012, p. 536-544.

S. Stanchits et al., Monitoring the Early Onset of Hydraulic Fracture Initiation by Acoustic Emission and Volumetric Deformation Measurements, American Rock Mechanics Association (ARMA), San Francisco, CA, USA, Jun. 2013, p. 1-9.

Baochau N. Nguyen, et al., Polyimide Cellulose Nanocrystal Composite Aerogels, ACS Macromolecules, Feb. 19, 2016, p. 1692-1703.

Tsuyoshi Ishida et al., Influence of Fluid Viscosity on the Hydraulic Fracturing Mechanism, Journal of Energy Resources Technology, Sep. 2004, p. 190-200.

\* cited by examiner

PROPPANT COMPRISING A CROSSLINKED POLYMER FOR TREATMENT OF SUBTERRANEAN FORMATIONS

BACKGROUND

A proppant is a material that keeps an induced hydraulic fracture at least partially open during or after a fracturing treatment. Proppants can be transported into the subterranean formation (e.g., downhole) to the fracture using fluid, such as fracturing fluid or another fluid. Proppants generally have a density that is greater than that of water, and thus have a tendency to settle unless a higher viscosity fluid is used for transport, such as a fluid including a crosslinked viscosifier. However, high viscosity fluids including crosslinked viscosifiers generally form large dominant fractures, and not smaller secondary fractures extending from dominant fractures. When a pad fluid including lower viscosity linear viscosifiers is used prior to the proppant slurry, the secondary fractures created can close before the proppant slurry can reach these fractures.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
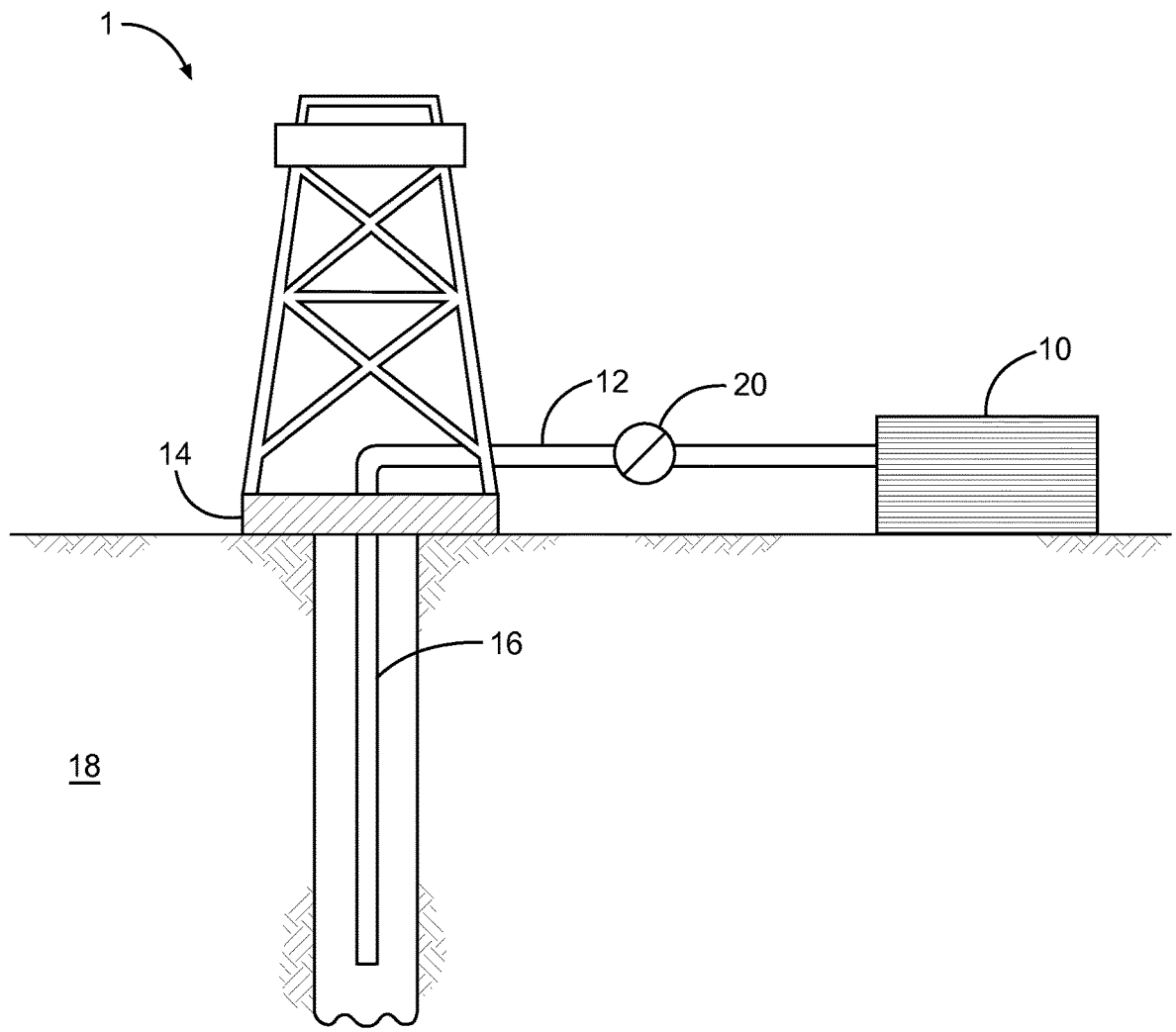
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^-$, which cannot be protonated. Accordingly, any compound substituted with an amino group can be viewed as an amine. An "amino group" within the meaning herein can be a primary, secondary, tertiary, or quaternary amino group. An "alkylamino" group includes a mono alkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are positive integers and mean having any of a to b number of carbon atoms. For example, (C$_1$-C$_4$)hydrocarbyl means the hydrocarbyl group can be methyl (CO, ethyl (C$_2$), propyl (C$_3$), or butyl (C$_4$), and (C$_0$-C$_b$)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "fracturing fluid" refers to fluids or slurries used downhole during fracturing operations.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including stimulation, hydraulic fracturing, acidizing, remedial treatment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, -H, -OH, a substituted or unsubstituted ($C_1$-$C_{20}$)hydrocarbyl (e.g., ($C_1$-$C_{10}$) alkyl or (C6-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in the subterranean formation a proppant. The proppant includes a crosslinked polymer.

In various embodiments, the present invention provides a method of treating a subterranean formation. The method includes placing in the subterranean formation a proppant including a crosslinked polyimide having the structure $A\text{-}P^1\text{—}R^2\text{-}A$, wherein $P^1$ has the structure:

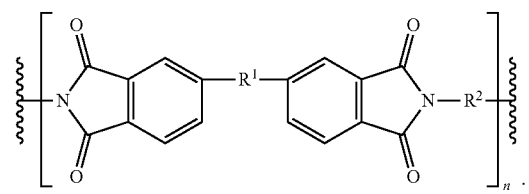

At each occurrence, A is selected from the group consisting of:

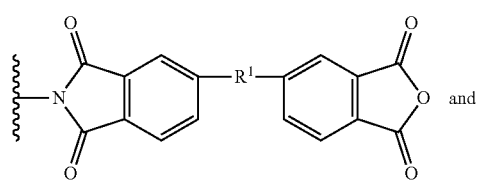

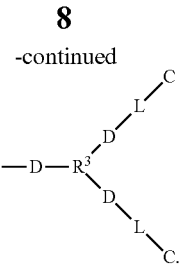

At each occurrence, $R^1$ is independently selected from the group consisting of a bond and —C(O)—. At each occurrence, $R^2$ is independently a substituted or unsubstituted ($C_1$-$C_{20}$)hydrocarbyl interrupted by 0, 1, 2, or 3 groups independently selected from the group consisting of —O—, —S—, and substituted or unsubstituted —NH—. At each occurrence, C is independently selected from the group consisting of —$NH_2$, -A, and —$P^1$—$R^2$-A. At each occurrence, D is independently selected from the group consisting of a bond, —O—, —NH—, —C(O)—O—, and —C(O)—NH—. At each occurrence, L is independently selected from the group consisting of a bond, a substituted or unsubstituted ($C_1$-$C_{20}$)hydrocarbylene interrupted by 0, 1, 2, or 3 groups independently selected from the group consisting of —O—, —S—, and substituted or unsubstituted —NH—. At each occurrence, $R^3$ is independently a trivalent substituted or unsubstituted ($C_1$-$C_{20}$)hydrocarbyl interrupted by 0, 1, 2, or 3 groups independently selected from the group consisting of —O—, —S—, and substituted or unsubstituted —NH—. At each occurrence, the variable n can be independently about 2 to about 100,000,000.

In various embodiments, the present invention provides a method of treating a subterranean formation. The method includes placing in the subterranean formation a proppant including a crosslinked polyimide having the structure $A\text{-}P^1\text{—}R^2\text{-}A$, wherein $P^1$ has the structure:

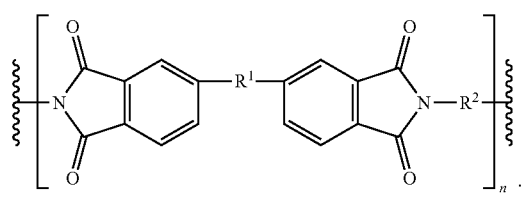

At each occurrence, A is selected from the group consisting of:

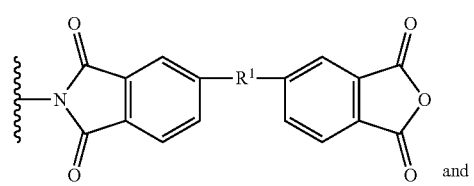

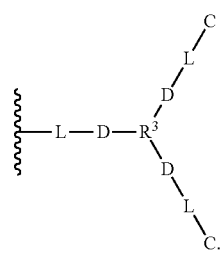

The variable $R^1$ is independently selected from the group consisting of a bond and —C(O)—. The variable $R^2$ is selected from the group consisting of:

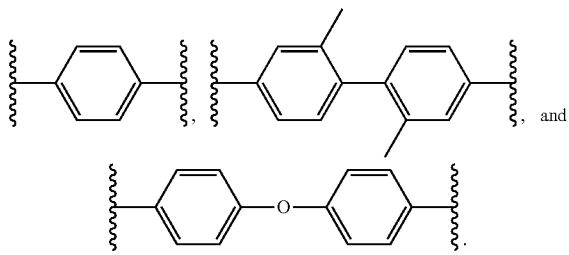

At each occurrence, C is independently selected from the group consisting of —NH$_2$, -A, and —P$^1$—R$^2$-A. The variable D is independently selected from the group consisting of —O— and —C(O)—NH—. At each occurrence, L is independently selected from the group consisting of:

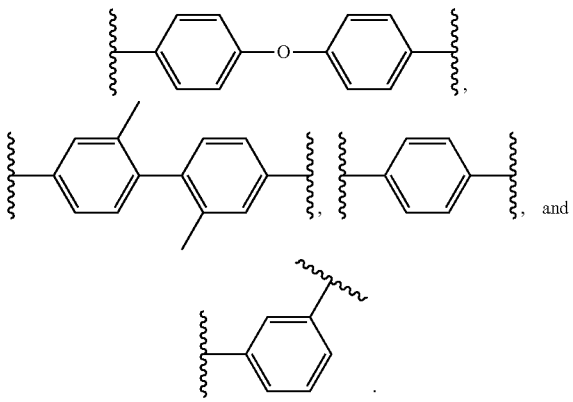

The variable $R^3$ is trivalent phenyl substituted at the 1, 3, and 5-positions by the -D-L-C. At each occurrence, the variable n can be independently about 2 to about 100,000,000.

In various embodiments, the present invention provides a system including a tubular disposed in a subterranean formation. The system also includes a pump configured to pump a composition including a proppant including a crosslinked polymer in the subterranean formation through the tubular.

In various embodiments, the present invention provides a proppant for treatment of a subterranean formation. The proppant includes a crosslinked polymer.

In various embodiments, the present invention provides a proppant for treatment of a subterranean formation. The proppant includes a crosslinked polyimide having the structure A-P$^1$—R$^2$-A, wherein P$^1$ has the structure:

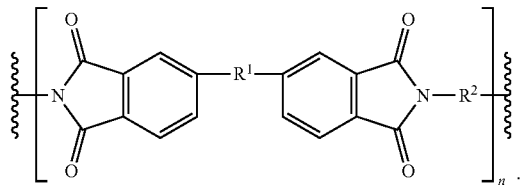

At each occurrence, A is selected from the group consisting of:

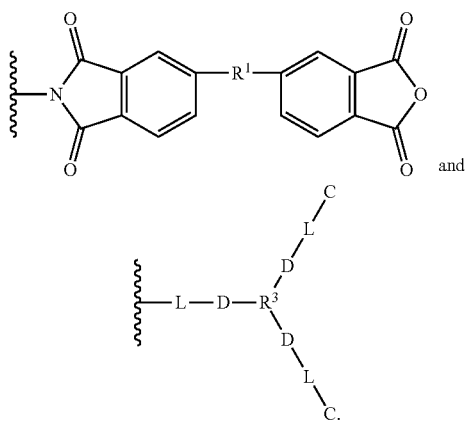

At each occurrence, $R^1$ is independently selected from the group consisting of a bond and —C(O)—. At each occurrence, $R^2$ is independently a substituted or unsubstituted (C$_1$-C$_{20}$)hydrocarbyl interrupted by 0, 1, 2, or 3 groups independently selected from the group consisting of —O—, —S—, and substituted or unsubstituted —NH—. At each occurrence, C is independently selected from the group consisting of —NH$_2$, -A, and —P$^1$—R$^2$-A. At each occurrence, D is independently selected from the group consisting of a bond, —O—, —NH—, —C(O)—O—, and —C(O)—NH—. At each occurrence, L is independently selected from the group consisting of a bond, a substituted or unsubstituted (C$_1$-C$_{20}$)hydrocarbylene interrupted by 0, 1, 2, or 3 groups independently selected from the group consisting of —O—, —S—, and substituted or unsubstituted —NH—. At each occurrence, $R^3$ is independently a trivalent substituted or unsubstituted (C$_1$-C$_{20}$)hydrocarbyl interrupted by 0, 1, 2, or 3 groups independently selected from the group consisting of —O—, —S—, and substituted or unsubstituted —NH—. At each occurrence, the variable n can be independently about 2 to about 100,000,000.

In various embodiments, the present invention provides a method of preparing a proppant for treatment of a subterranean formation. The method includes forming a proppant including a crosslinked polymer.

In various embodiments, the proppant has certain advantages over other proppants, at least some of which are unexpected. For example, in various embodiments, the proppants of the present invention can have a lower density than other proppants, such as closer to or lower than the density of water, allowing the suspension of the proppant in lower viscosity fluids such as linear pad fluids (e.g., pad fluids including linear non-crosslinked viscosifier) or slickwater fluids (e.g., fluids having the viscosity of water or lower viscosity than water) with less settling than other proppants. In some embodiments, by suspending the proppant in lower viscosity fluids (e.g., slick water or fluids including linear non-crosslinked viscosifiers), the proppant can be placed in secondary fractures more effectively than other proppants, such as secondary fractures formed using the lower viscosity fluid. In various embodiments, by suspending the proppant in a lower viscosity fluid, the proppant can be placed more deeply in secondary fractures than other proppants. In various embodiments, the low viscosity fluid including the proppant can be placed in the subterranean formation repeatedly and sequentially with a high viscosity fluid, providing the formation of both dominant and secondary fractures, and avoiding the closure of the secondary fractures via placement of the proppant therein. In various embodiments, the proppant of the present invention can have enhanced placement in a fracture network, such as enhanced placement and vertical distribution within the secondary fractures (e.g., microfractures). In various embodiments, methods of treating subterranean formations with the proppant can provide enhanced conductivity compared to other proppants, such as 20%, 30%, or 40% or more greater conductivity.

In various embodiments, the density, compressive strength, tensile strength, or any combination thereof can be tuned or adjusted to a desired value by adjustment of the chemical structure of the crosslinked polymer in the proppant, by adjusting the porosity of the proppant, by adjusting the amount and type of secondary materials in the proppant such as fillers, and by any combination thereof. In various embodiments, the particle size of the proppant can be easily controlled, such that a wide variety of particle sizes can be easily generated, as well as any desired particle distribution.

In various embodiments, the lower density of the proppant provides lower transportation costs of getting the proppant to a work site, as compared to other proppants. In various embodiments, the proppant can be highly thermally stable (e.g., up to 400° C. or higher). In various embodiments, the proppant and the starting materials needed to make the proppant can be cheaply and easily available. In various embodiments, the crosslinked polymer in the proppant can be easily and inexpensively synthesized.

Method of Treating a Subterranean Formation.

In some embodiments, the present invention provides a method of treating a subterranean formation. The method includes placing in the subterranean formation a proppant including a crosslinked polymer. The method can include placing in the subterranean formation a composition that includes the proppant including the crosslinked polymer.

The placing of the proppant or composition including the same in the subterranean formation can include contacting the proppant or composition including the same and any suitable part of the subterranean formation, or contacting the proppant or composition including the same and a subterranean material, such as any suitable subterranean material. The subterranean formation can be any suitable subterranean formation. In some examples, the placing of the proppant or composition including the same in the subterranean formation includes contacting the proppant or composition including the same with or placing the proppant or composition including the same in at least one of a fracture, at least a part of an area surrounding a fracture, a flow pathway, an area surrounding a flow pathway, and an area desired to be fractured. The placing of the proppant or composition including the same in the subterranean formation can be any suitable placing and can include any suitable contacting between the subterranean formation and the proppant or composition including the same. The placing of the composition in the subterranean formation can include at least partially depositing the proppant or composition including the same in a fracture, flow pathway, or area surrounding the same.

In some embodiments, the method includes obtaining or providing the composition including the proppant including the crosslinked polymer. The obtaining or providing of the composition can occur at any suitable time and at any suitable location. The obtaining or providing of the composition can occur above the surface (e.g., the proppant and other components of the composition can be combined to form the composition above-surface). The obtaining or providing of the composition can occur in the subterranean formation (e.g., the proppant and other components of the composition can be combined to form the composition downhole).

The method can include hydraulic fracturing, such as a method of hydraulic fracturing to generate a fracture or flow pathway. The placing of the proppant or composition including the same in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the proppant or composition including the same in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed in or contacted to, or the composition is placed in or contacted to an area surrounding the generated fracture or flow pathway. In some embodiments, the method can be or can include a method of stimulation, fracturing, remedial treatment, logging, or a combination thereof. The composition can include or can be a stimulation fluid, a fracturing fluid, a remedial treatment fluid, a logging fluid, or a combination thereof.

In some embodiments, the method can include placing a pad fluid including a cross-linked viscosifier in the subterranean formation before or after placing the composition including the proppant in the subterranean formation. The method can include repeatedly and sequentially placing a pad fluid including a cross-linked viscosifier and the composition including the proppant in the subterranean formation.

The proppant can have any suitable size and shape. The proppant can be substantially spherical, or the proppant can be irregular. The proppant can be solid throughout or hollow in the center, such as a hollow sphere. The proppant can have a particle size (e.g., the largest dimension of the particle) of about 1 nm to about 10 mm, about 500 nm to about 3 mm, or about 1 nm or less, or less than, equal to, or more than about 2 nm, 4, 6, 8, 10, 15, 20, 30, 40, 50, 60, 70, 80, 90, 100, 150, 200, 300, 400, 500, 600, 700, 800, 900 nm, 1 micron, 2, 4, 6, 8, 10, 15, 20, 30, 40, 50, 60, 70, 80, 90, 100, 150, 200, 300, 400, 500, 600, 700, 800, 900 microns, 1 mm, 1.2, 1.4, 1.6, 1.8, 2, 2.2, 2.4, 2.6, 2.8, 3, 4, 5, 6, 7, 8, 9, or about 10 mm or more. The proppant can have particle mesh size in the range of 10/16, 16/20, 20/40, or about 40/70.

The proppant can have any suitable tensile strength. The proppant can have a tensile strength of about 1 MPa to about 100 MPa, about 5 MPa to about 20 MPa, about 1 MPa or less, or less than, equal to, or more than about 2 MPa, 3, 4, 5, 6, 7, 8, 9, 10, 11, 12, 13, 14, 15, 16, 17, 18, 19, 20, 25, 30, 35, 40, 45, 50, 60, 70, 80, 90, or about 100 MPa or more.

The proppant can have any suitable compressive strength. The proppant can have a compressive strength of about 1 MPa to about 10,000 MPa, about 50 MPa to about 300 MPa, about 1 MPa or less, or less than, equal to, or greater than about 2 MPa, 3, 4, 5, 6, 7, 8, 9, 10, 11, 12, 13, 14, 15, 16, 17, 18, 19, 20, 25, 30, 35, 40, 45, 50, 60, 70, 80, 90, 100, 120, 140, 160, 180, 200, 220, 240, 260, 280, 300, 400, 500, 750, 1,000, 1,500, 2,000, 2,500, 5,000, 7,500, or about 10,000 MPa or more.

The proppant can have any suitable density. The proppant can have a density that is distributed around a single density, or distributed around more than one density. In some embodiments, some of the proppant is more dense than water, while the remainder of the proppant is less dense than water or closer to the density of water. The proppant can have a density of about 0.1 g/cm$^3$ to about 3 g/cm$^3$, about 0.2 g/cm$^3$ to about 2.5 g/cm$^3$, about 0.2 g/cm$^3$ to about 2.3 g/cm$^3$, about 0.1 g/cm$^3$ or less, or about 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or about 3 g/cm$^3$ or more.

In some embodiments, the composition is free of viscosifiers. In some embodiments, the composition includes friction-reducing materials. The composition can have a viscosity less than water. In some embodiments, the composition can have a viscosity greater than water, and can include one or more viscosifiers. The composition can include a linear non-crosslinked viscosifier. The composition can include a cross-linked viscosifier.

In some embodiments, the proppant can include a filler. The proppant can include one filler, or multiple filler. The fillers can be any suitable filler, provided that the proppant can be used as described herein. The filler can be a nanoclay (e.g., a clay obtained by dispersion of organoclays), graphite, graphite oxide, modified graphene oxide, crystalline nanocellulose (CNC), nanoparticles of silica, silsesquioxanes nanoparticles, carbon nanotubes, and the like. The filler can have any suitable particle size, such as about 1 nm to about 1 mm, about 1 nm to about 1000 nm, or about 1 nm or less, or less than, equal to, or more than about 2 nm, 4, 6, 8, 10, 15, 20, 30, 40, 50, 60, 70, 80, 90, 100, 150, 200, 300, 400, 500, 600, 700, 800, 900 nm, 1 micron, 2, 4, 6, 8, 10, 15, 20, 30, 40, 50, 60, 70, 80, 90, 100, 150, 200, 300, 400, 500, 600, 700, 800, 900 microns, or about 1 mm or more.

Crosslinked Polymer.

The proppant includes a crosslinked polymer. The crosslinked polymer can be any suitable crosslinked polymer, such that the proppant can be used as described herein. The crosslinked polymer can be selected from the group consisting of a crosslinked polyimide, a crosslinked epoxy-based material, a crosslinked furan-based resin, a crosslinked polyacrylate, a crosslinked vinyl polymer, a crosslinked polyaryl ether sulfone, and combinations thereof. The proppant can include one crosslinked polymer or more than one crosslinked polymer. The one or more crosslinked polymers can form any suitable proportion of the proppant, such as about 0.01 wt % of the proppant to about 100 wt % of the proppant, about 80 wt % to about 100 wt % of the proppant, or about 0.01 wt % or less, or less than, equal to, or greater than about 0.1 wt %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more.

In various embodiments, the crosslinked polymer can be an aerogel. An aerogel is a light material derived from drying the solvent from a gel, wherein the liquid component of the gel is at least partially replaced with a gas.

The crosslinked polymer can be a crosslinked polyimide. The crosslinked polyimide can be selected from the group consisting of a triamine-crosslinked polyimide and a triamide-crosslinked polyimide. In some embodiments, in addition to the crosslinked polyimide, the proppant can include at least one other polymer. The at least one other polymer can be selected from the group consisting of a crosslinked polyimide, a crosslinked epoxy-based material, a crosslinked furan-based resin, a crosslinked polyacrylate, a crosslinked vinyl polymer, a polyaryl ether sulfone, and combinations thereof.

The crosslinked polyimide can include a repeating group having the structure:

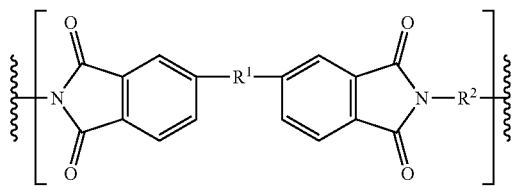

At each occurrence, $R^1$ can be independently selected from the group consisting of a bond and —C(O)—. The variable $R^1$ can be a bond. The variable $R^1$ can be —C(O)—. At each occurrence, $R^2$ can be independently a substituted or unsubstituted $(C_1-C_{20})$hydrocarbyl interrupted by 0, 1, 2, or 3 groups independently selected from the group consisting of —O—, —S—, and substituted or unsubstituted —NH—. The variable $R^2$ can be selected from the group consisting of $(C_4-C_{10})$aryl and —$(C_4-C_{10})$aryl-O—$(C_4-C_{10})$aryl-, wherein each $(C_4-C_{10})$aryl is independently substituted or unsubstituted. The variable $R^2$ can be selected from the group consisting of -phenyl-, and -phenyl-O-phenyl-, wherein each phenyl is independently substituted or unsubstituted. The variable $R^2$ can be selected from the group consisting of:

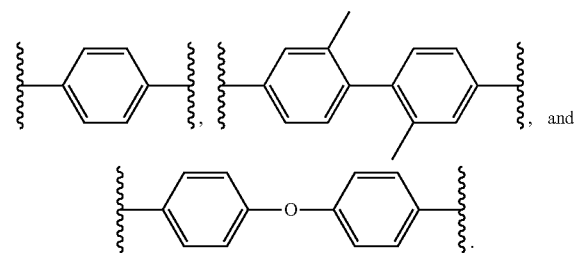

The crosslinked polyimide can have the structure A-$P^1$—$R^2$-A, wherein $P^1$ has the structure:

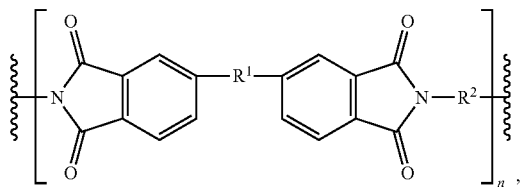

At each occurrence, A can be selected from the group consisting of:

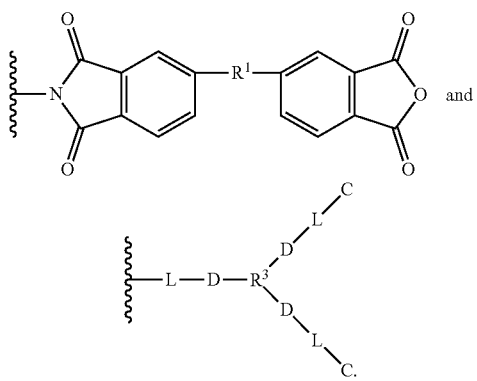

At each occurrence, C can be independently selected from the group consisting of —NH$_2$, -A, and —P$^1$—R$^2$-A. At each occurrence, D can be independently selected from the group consisting of a bond, —O—, —NH—, —C(O)—O—, and —C(O)—NH—. At each occurrence, L can be independently selected from the group consisting of a bond, a substituted or unsubstituted (C$_1$-C$_{20}$)hydrocarbylene interrupted by 0, 1, 2, or 3 groups independently selected from the group consisting of —O—, —S—, and substituted or unsubstituted —NH—. At each occurrence, R$^3$ can be independently a trivalent substituted or unsubstituted (C$_1$-C$_{20}$) hydrocarbyl interrupted by 0, 1, 2, or 3 groups independently selected from the group consisting of —O—, —S—, and substituted or unsubstituted —NH—. At each occurrence, the variable n can be independently about 2 to about 100,000,000.

At each occurrence, A can be selected from the group consisting of:

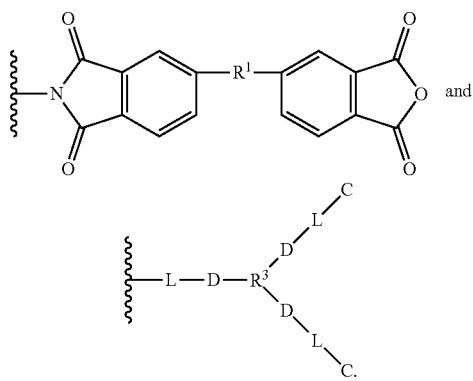

The variable A can be:

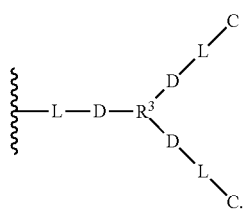

At each occurrence, C can be independently selected from the group consisting of —NH$_2$, -A, and —P$^1$—R$^2$-A, wherein if P$^1$ is bound to L then the non-R$^2$-contaning-end of P$^1$ is bound to L. At each occurrence, C can be independently selected from the group consisting of -A and —P$^1$—R$^2$-A.

At each occurrence, D can be independently selected from the group consisting of a bond, —O—, —NH—, —C(O)—O—, and —C(O)—NH—, wherein the C(O) of the —C(O)—O— or —C(O)—NH— group is closer to R$^3$ than the —O— or —NH—. The variable D can be selected from the group consisting of —O— and —C(O)—NH—. The variable D can be —O—. The variable D can be —C(O)—NH—, wherein the C(O) of the —C(O)—NH— is closer to R$^3$ than the —NH— of the —C(O)—NH—.

At each occurrence, L can be independently selected from the group consisting of a bond, a substituted or unsubstituted (C$_1$-C$_{20}$)hydrocarbylene interrupted by 0, 1, 2, or 3 groups independently selected from the group consisting of —O—, —S—, and substituted or unsubstituted —NH—. The variable L can be selected from the group consisting of (C$_4$-C$_{10}$)arylene and —(C$_4$-C$_{10}$)arylene-O—(C$_4$-C$_{10}$)arylene-, wherein each (C$_4$-C$_{10}$)arylene is independently substituted or unsubstituted. The variable L can be selected from the group consisting of -phenylene-, and -phenylene-O-phenylene-, wherein each phenyl is independently substituted or unsubstituted. The variable L can be selected from the group consisting of:

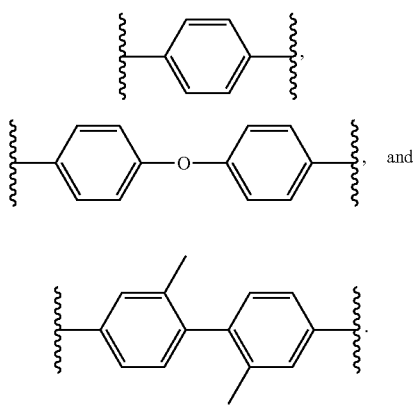

The variable L can be selected from the group consisting of:

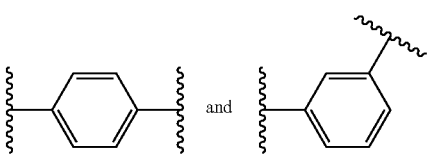

The variable L can be selected from the group consisting of:

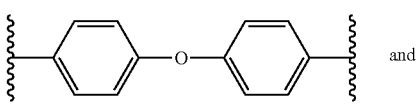

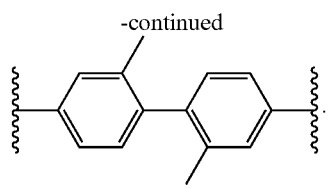

At each occurrence, $R^3$ can be independently a trivalent substituted or unsubstituted $(C_1-C_{20})$hydrocarbyl interrupted by 0, 1, 2, or 3 groups independently selected from the group consisting of —O—, —S—, and substituted or unsubstituted —NH—. The variable $R^3$ can be a trivalent substituted or unsubstituted $(C_4-C_{10})$aryl. The variable $R^3$ can be trivalent phenyl. The variable $R^3$ can be trivalent phenyl substituted at the 1, 3, and 5-positions by the -D-L-C group.

At each occurrence, the variable n can be independently about 2 to about 100,000,000, or about 2 to about 1,000,000, or about 2, or less than, equal to, or greater than about 3, 4, 5, 6, 8, 10, 12, 14, 16, 18, 20, 25, 30, 35, 40, 45, 50, 60, 70, 80, 90, 100, 125, 150, 175, 200, 250, 300, 400, 500, 750, 1,000, 1,500, 2,000, 2,500, 5,000, 10,000, 15,000, 20,000, 25,000, 50,000, 75,000, 100,000, 150,000, 200,000, 250,000, 500,000, 1,000,000, 2,000,000, 5,000,000, 10,000,000, 50,000,000, or about 100,000,000 or more. The crosslinked polymer can have any suitable molecular weight, such as about 200 to about 1,000,000,000, or about 200 to about 100,000,000, or about 200, or less than, equal to, or greater than about 300, 400, 500, 750, 1,000, 1,500, 2,000, 2,500, 5,000, 10,000, 15,000, 20,000, 25,000, 50,000, 75,000, 100,000, 150,000, 200,000, 250,000, 500,000, 1,000,000, 2,000,000, 5,000,000, 10,000,000, 50,000,000, 100,000,000, 200,000,000, 500,000,000, or about 1,000,000,000 or more.

In some embodiments, L can be selected from the group consisting of:

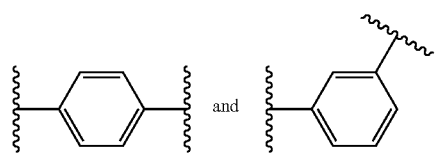

The variable D can be —O—. The variable $R^3$ can be trivalent phenyl substituted at the 1, 3, and 5-positions by the -D-L-C.

In some embodiments, the variable L can be selected from the group consisting of:

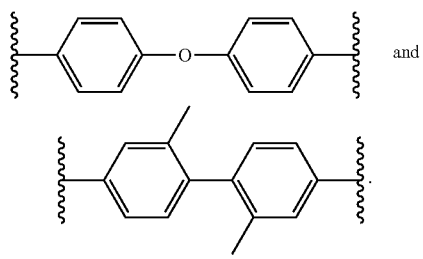

The variable D can be —C(O)—NH—, wherein the C(O) of the —C(O)—NH— is closer to $R^3$ than the —NH— of the —C(O)—NH—. The variable $R^3$ can be trivalent phenyl substituted at the 1, 3, and 5-positions by the -D-L-C.

In some embodiments, the crosslinked polymer is a crosslinked polyimide having the structure A-$P^1$—$R^2$-A, wherein $P^1$ has the structure:

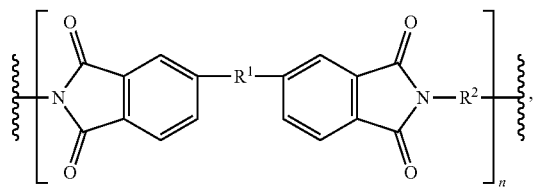

At each occurrence, A can be selected from the group consisting of:

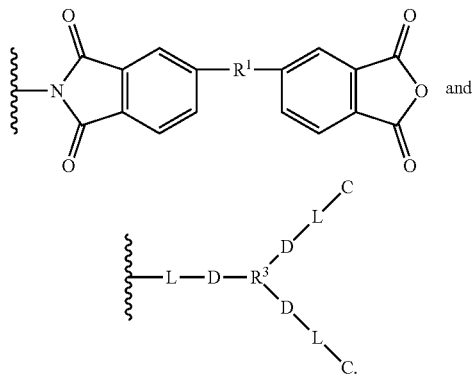

At each occurrence, C can be independently selected from the group consisting of —$NH_2$, -A, and —$P^1$—$R^2$-A. The variable $R^1$ can be selected from the group consisting of a bond and —C(O)—. The variable $R^2$ can be selected from the group consisting of:

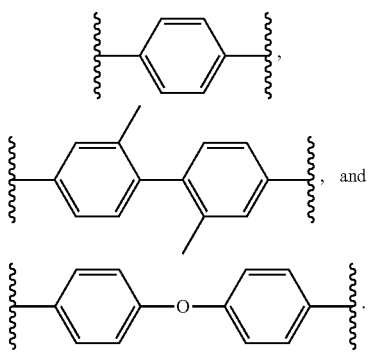

The variable D can be —O—. The variable L can be selected from the group consisting of:

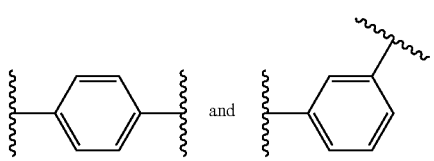

The variable R³ can be trivalent phenyl substituted at the 1, 3, and 5-positions by the -D-L-C. At each occurrence, the variable n is independently about 2 to about 100,000,000.

In various embodiments, the crosslinked polyimide has the structure A-P¹—R²-A, wherein P¹ has the structure:

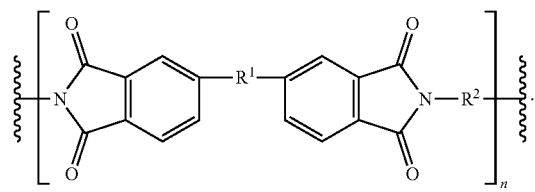

At each occurrence, A can be selected from the group consisting of:

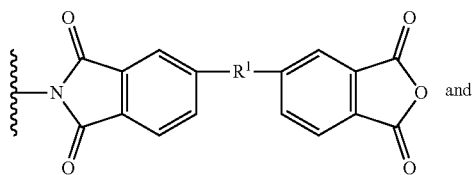

and

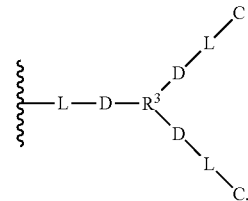

At each occurrence, C can be independently selected from the group consisting of —NH₂, -A, and —P¹—R²-A. The variable R¹ can be a bond. The variable R² can be selected from the group consisting of:

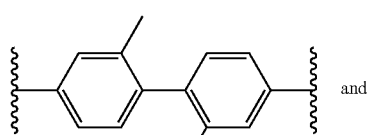

The variable D can be —C(O)—NH—, wherein the C(O) of the —C(O)—NH— is closer to R³ than the —NH— of the —C(O)—NH—. At each occurrence, L can be independently selected from the group consisting of:

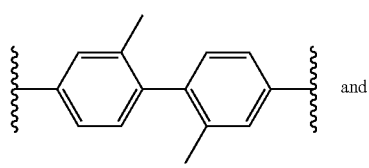

and

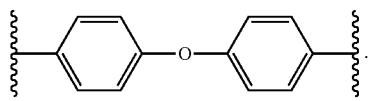

The variable R³ can be trivalent phenyl substituted at the 1, 3, and 5-positions by the -D-L-C. At each occurrence, n can be independently about 2 to about 100,000,000.

In various embodiments, the crosslinked polyimide can have the structure A-P¹—R²-A, wherein P¹ has the structure:

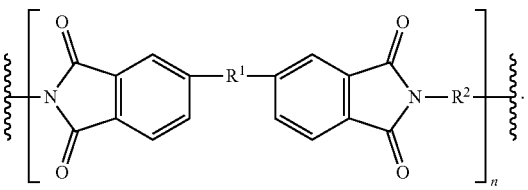

At each occurrence, A can be selected from the group consisting of:

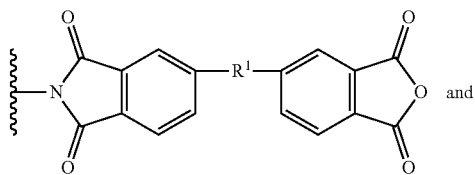

and

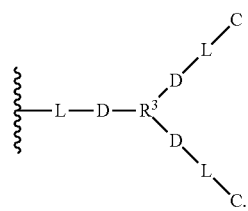

The variable R¹ can be independently selected from the group consisting of a bond and —C(O)—. The variable R² can be selected from the group consisting of:

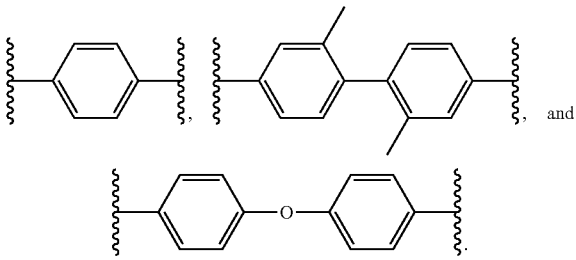

At each occurrence, C can be independently selected from the group consisting of —NH₂, -A, and —P¹—R²-A. The variable D can be independently selected from the group consisting of —O— and —C(O)—NH—. At each occurrence, L can be independently selected from the group consisting of:

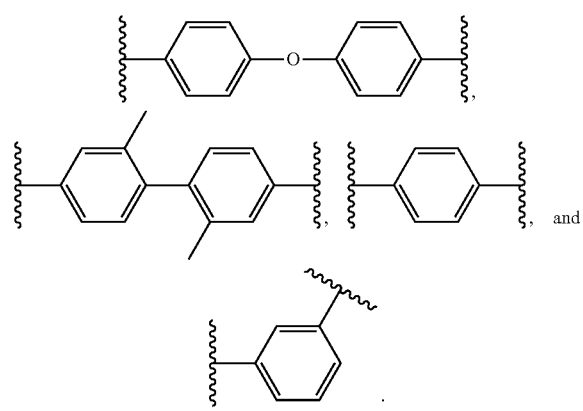

The variable R³ can be trivalent phenyl substituted at the 1, 3, and 5-positions by the -D-L-C. At each occurrence, n can be independently about 2 to about 100,000,000.

Other Components.

The proppant including the crosslinked polymer, the composition including the proppant, or a mixture including the composition, can include any suitable additional component in any suitable proportion, such that the proppant, composition, or mixture including the same, can be used as described herein. Any component listed in this section can be present or not present in the composition or a mixture including the same.

In some embodiments, the composition or a mixture including the same includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide and a poly(($C_2$-$C_{10}$)alkene), wherein the ($C_2$-$C_{10}$)alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_5$0)hydrocarbyl having at least one aliphatic unsaturated C—C bond therein, and a substituted or unsubstituted ($C_2$-$C_{20}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen-containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$) alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition or a mixture including the same, about 0.001 wt % to about 0.01 wt %, or about 0.000.01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the proppant or a mixture including the same can include or can be any suitable downhole fluid. The proppant, or the composition including the proppant, can be combined with any suitable downhole fluid before, during, or after the placement of the composition in the subterranean formation or the contacting of the composition and the subterranean material. In some examples, the proppant, or the composition including the proppant, is combined with a downhole fluid above the surface, and then the combined composition is placed in a subterranean formation or contacted with a subterranean material. In another example, the proppant, or the composition including the proppant, is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the proppant including the cross-linked polymer, the composition including the proppant, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: X-TEND® II, PAC™-R, PAC™-L, LIQUI-VIS® EP, BRINEDRIL-VIS™, BARAZANO, N-VIS®, and AQUA-GEL® viscosifiers; PERFORMATROL®, GEM™, EZ-MUD®, CLAY GRABBER®, CLAYSEAL®, CRYSTAL-DRIL®, and CLAY SYNC™ II shale stabilizers; QUIK-THIN®, IRON-THIN™, THERMA-THIN®, and ENVIRO-THIN™ thinners; SOURSCAV™ scavenger; BARACOR® corrosion inhibitor. Any suitable proportion of the proppant, composition, or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

In various embodiments, the composition or mixture can include a secondary proppant, a resin-coated secondary proppant, or a combination thereof. Examples of secondary proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the secondary proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the secondary proppant can have a distribution of particle sizes clustering around multiple averages, such as one, two, three, or four different average particle sizes. The composition or mixture can include any suitable amount of secondary proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including the proppant including a crosslinked polymer. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

In various embodiments, the present invention provides a system including a tubular disposed in a subterranean formation. The system can also include a pump configured to pump a composition including the proppant including a crosslinked polymer in the subterranean formation through the tubular.

Various embodiments provide systems and apparatus configured for delivering the composition described herein to a subterranean location and for using the composition therein, such as for a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the proppant including a crosslinked polymer described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of the proppant therein. In some embodiments, the composition that has flowed back to wellhead 14 can subsequently be recovered and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Proppant and Composition Including the Same for Treatment of a Subterranean Formation.

Various embodiments provide a proppant for treatment of a subterranean formation. The proppant can be any suitable proppant including a crosslinked polymer described herein.

Various embodiments provide a composition including a proppant for treatment of a subterranean formation. The composition can be any suitable composition that can be used to perform an embodiment of the method for treatment of a subterranean formation described herein.

In some embodiments, the composition can be or further includes a downhole fluid. The downhole fluid can be any suitable downhole fluid. In some embodiments, the downhole fluid is a stimulation fluid, a fracturing fluid, a remedial treatment fluid, an acidizing fluid, a logging fluid, or a combination thereof.

In some embodiments, the proppant can include a crosslinked polyimide having the structure $A\text{-}P^1\text{—}R^2\text{-}A$, wherein $P^1$ has the structure:

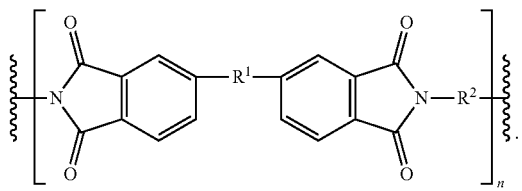

At each occurrence, A can be selected from the group consisting of:

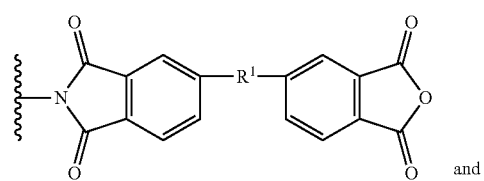

and

-continued

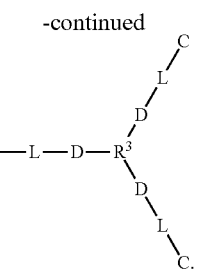

At each occurrence, $R^1$ can be independently selected from the group consisting of a bond and —C(O)—. At each occurrence, $R^2$ can be independently a substituted or unsubstituted ($C_1$-$C_{20}$)hydrocarbyl interrupted by 0, 1, 2, or 3 groups independently selected from the group consisting of —O—, —S—, and substituted or unsubstituted —NH—. At each occurrence, C can be independently selected from the group consisting of —$NH_2$, -A, and —$P^1$—$R^2$-A. At each occurrence, D can be independently selected from the group consisting of a bond, —O—, —NH—, —C(O)—O—, and —C(O)—NH—. At each occurrence, L can be independently selected from the group consisting of a bond, a substituted or unsubstituted ($C_1$-$C_{20}$)hydrocarbylene interrupted by 0, 1, 2, or 3 groups independently selected from the group consisting of —O—, —S—, and substituted or unsubstituted —NH—. At each occurrence, $R^3$ can be independently a trivalent substituted or unsubstituted ($C_1$-$C_{20}$) hydrocarbyl interrupted by 0, 1, 2, or 3 groups independently selected from the group consisting of —O—, —S—, and substituted or unsubstituted —NH—. At each occurrence, the variable n can be independently about 2 to about 100,000,000.

Method for Preparing a Proppant or Composition Including the Same for Treatment of a Subterranean Formation.

In various embodiments, the present invention provides a method for preparing a proppant or composition including the same for treatment of a subterranean formation. The method can be any suitable method that produces a proppant or composition described herein. For example, the method can include forming a proppant including a crosslinked polymer. In another example, the method can include forming a composition including the proppant, including combining one or more components of the composition (e.g., combining the proppant with other components) to form the composition.

EXAMPLES

Various embodiments of the present invention can be better understood by reference to the following Examples which are offered by way of illustration. The present invention is not limited to the Examples given herein. The Examples are based on procedures described in ACS Appl. Mater. & Interfaces 2015, 7(2), 1240-1249 and ACS Appl. Mater. & Interfaces 2012, 4(2), 536-544.

Example 1

Polyimide Aerogels with Triamine Crosslinker

Materials. 1,3,5-Triaminophenoxybenzene (TAB) was obtained from Triton Systems (200 Turnpike Rd #2, Chelmsford, Mass. 01824-4053). Pyridine, acetic anhydride, p-phenylene diamine (PPDA), and anhydrous N-methylpyrrolidinone (NMP) were purchased from Sigma Aldrich. 2,2'-Dimethylbenzidine (DMBZ), 4,4'-oxydianiline (ODA), benzophenone-3,3',4,4'-tetracarboxylic dianhydride (BTDA), and biphenyl-3,3',4,4'-tetracarboxylic dianydride (BPDA) were obtained from Chriskev, Inc. (13920 W 108th Street, Lenexa, Kans., 66215). Dianhydrides were dried at 125° C. in vacuum for 24 h before use. All other reagents were used without further purification.

Instrumentation. Attenuated total reflectance (ATR) infrared spectroscopy was conducted using a Nicolet Nexus 470 FT-IR spectrometer. $^{13}$C NMR spectra of the polymers were obtained on a Bruker Avance 300 spectrometer using 4 mm solids probe with magic angle spinning at 11 kHz and cross-polarization. Spectra were externally referenced to the carbonyl peak of glycine (176.1 ppm relative to TMS). A Hitachi S-4700 field emission microscope was used for the scanning electron microscope (SEM) images after sputter coating the specimens with gold. The samples were outgassed at 80° C. for 8 h under vacuum before running nitrogen-adsorption porosimetry with an ASAP 2000 surface Area/Pore Distribution analyzer (Micromeritics Instrument Corp.) The skeletal density was measured using a Micromeritics Accupyc 1340 helium pycnometer. Thermal gravimetric analyses (TGA) was performed using a TA model 2950 HiRes instrument. Samples were run at a temperature ramp rate of 10° C. per min from room temperature to 750° C. under nitrogen and air. Glass transition temperatures were obtained using a TMA 2940 thermomechanical analyzer from TA Instruments.

Synthesis of Polyimide Aerogels Using Chemical Imidization. Aerogels from three different diamines (ODA, DMBZ, or PPDA) and two different dianhydrides (BPDA or BTDA) with the formulated number of repeat units, n, varied between 15 and 30, were prepared according to Table 1 as 10 wt % solutions of polyimide in NMP. As an example, preparation of n=30 polyimide aerogel using BPDA, TAB and ODA (Table 1, run 22) is described. To a solution of ODA (3.16 g, 15.8 mmol) in 50 mL of NMP under nitrogen was added BPDA (4.79 g, 16.3 mmol). After all the BPDA dissolved, a solution of TAB (0.14 g, 0.35 mmol) in 16 mL of NMP was added with stirring. After 10 min of stirring, acetic anhydride (12.3 mL, 130 mmol, 8:1 molar ratio to BPDA) and pyridine (10.5 mL, 130 mmol) were added to the solution. Immediately after mixing, the solution was poured into prepared molds. The solution gelled within 20 min. The gels were aged for 24 h in the mold. Following aging, the gels were extracted into a solution of 75% NMP in acetone and soaked overnight. Subsequently, the solvent was exchanged in 24 h intervals with 25% NMP in acetone, and finally 100% acetone. The solvent was removed by supercritical $CO_2$ extraction, followed by vacuum drying overnight at 80° C., resulting in polyimide aerogels having a density of 0.203 g/cm$^3$. $^{13}$C CPMAS NMR (ppm): 124.4, 130.7, 143.2, 155, 165.6. FTIR: 1774.7, 1718.2, 1501.0, 1374.8, 1241.4, 1170.3, 1115.3 1087.8, 878.9, 830.0, 737.6.

Thin film fabrication was carried out using a roll-to-roll casting system. The same 10 w/w % NMP solution as above was cast onto a PET carrier film running at a speed of 80 cm/min using a 12 in. wide Doctor blade with front opening gap set at 1.09 mm. The film that gelled within 30 min was sealed in a plastic bag and aged for 24 h before peeling away from the PET carrier. Afterwards, the films were washed in 24 h intervals in 75% NMP in acetone, followed by 25% NMP in acetone, and finally in 100% acetone. Supercritical drying gave polyimide aerogel thin films (0.45 mm) with similar properties to above.

Compression Tests. The specimens were tested in accordance with ASTM D695-10 with the sample sizes nominally 1.5-1.8 cm in diameter and 3 cm in length (close to the 1:2 ratio of diameter to length prescribed for the testing of polymer foams). The samples were tested between a pair of compression platens on a model 4505 Instron load frame using the Series IX data acquisition software. The platen surfaces were coated with a graphite lubricant to reduce the surface friction and barreling of the specimen.

Tensile Tests. Thin film specimens nominally 5 mm wide by 33 mm long were mounted on a rectangular paperboard frame using adhesive tape. This setup supports and aligns the flexible film to install on the Instron 5567 load frame controlled with Bluehill software. The sides of the paperboard were cut after mounting and before the test. Tensile tests were run using 100 N load and an extension speed of 2 mm/min based on ASTM D882. Reported tensile properties are the average of six tests.

Statistical Analyses. Experimental design and analyses were conducted using Design Expert Version 8.1, available from Stat-Ease, Inc., Minneapolis, Minn. Multiple linear regression analysis was used to derive empirical models to describe the effect of each of the process variables studied on measured properties. Full quadratic models including all main effects, second-order effects and all two way interactions was entertained, and continuous variables were orthogonalized (transformed to −1 to +1 scale) before analysis. Terms deemed to not be significant in the model (<90% confidence) were eliminated one at a time using a backward stepwise regression technique.

Figure 2A:
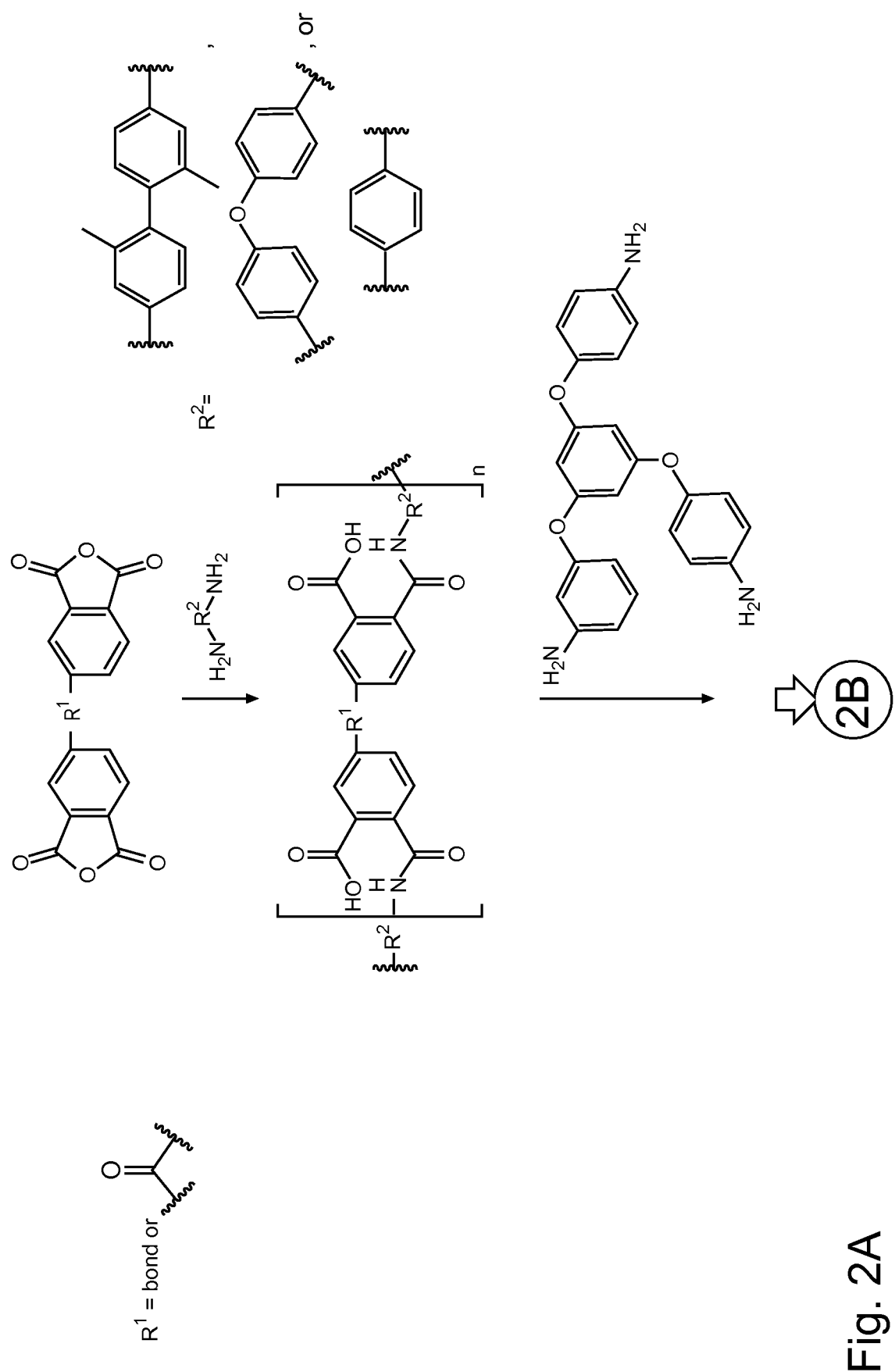
FIGS. 2A-B illustrate a synthetic scheme for synthesis of polyimide aerogels with a triamine crosslinker, in accordance with various embodiments.
Figure 2B:
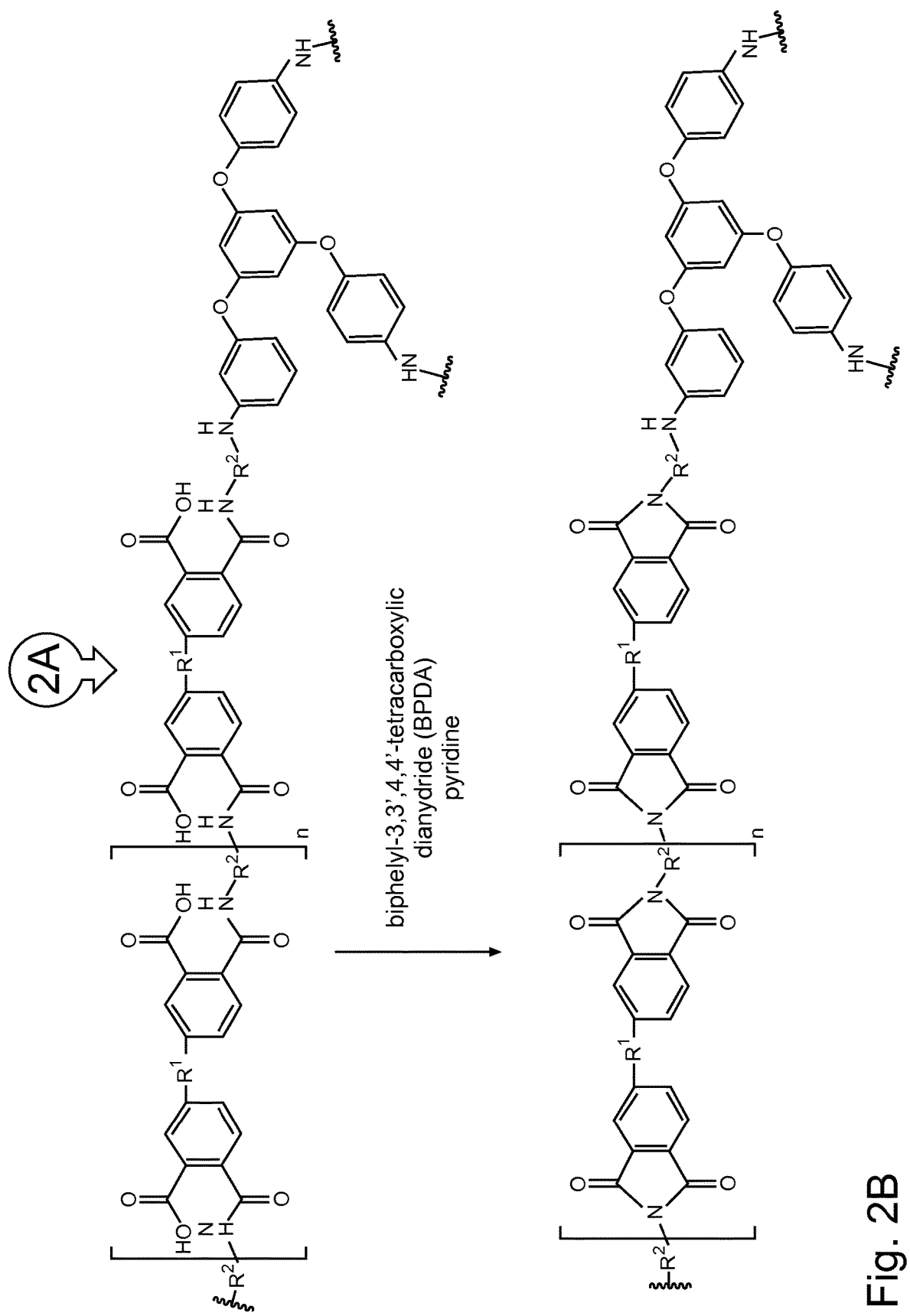

A schematic of the synthesis is shown in FIGS. 2A-B.
The aerogels had the properties shown in Table 1.

around 9 MPa and corresponding compressive strengths in the range of 13,200 PSI to 39,600 PSI.

Example 2. Polyimide aerogels with triamide crosslinker.

Polyimide aerogels were formed using 1,3,5-benzenetricarbonyl trichloride (BTC) crosslinker, which was less expensive than the 1,3,5-triaminophenoxybenzene (TAB) crosslinker used in Example 1.

Materials. Acetic anhydride (NA), triethylamine (TEA), and 1,3,5-benzenetricarbonyl trichloride (BTC) were purchased from Sigma-Aldrich (3050 Spruce Street, St. Louis, MO. 63103). Anhydrous N-methylpyrrolidinone (NMP) was purchased from Tedia (1000 Tedia Way, Fairfield, Ohio 45014). 2,2'-Dimethylbenzidine (DMBZ), 4,4'-oxidianiline (ODA), and biphenyl-3,3',4,4'-tetracarboxylic dianhydride (BPDA) were obtained from Chriskev, Inc. (13920 W. 108th Street, Lenexa, Kans. 66215). Dianhydrides were dried at 125° C. in vacuum for 24 h before use. All other reagents were used without further purification.

General. Nitrogen-adsorption porosimetry was carried out with an ASAP 2000 surface area/pore distribution analyzer (Micrometrics Instrument Corp.). A Micrometrics Accupyc 1340 helium pycnometer was used to measure the skeletal density of the specimens. A TA model 2950 HiRes instrument was used to perform thermal gravimetric analysis (TGA). Thermomechanical analysis was performed using a TMA 2940 from TA Instruments. Infrared spectroscopy was performed using a Nicolet Nexus 470 FTIR spectrometer. A Bruker Avance 300 spectrometer was used to obtain $^{13}$C NMR spectra of the polymers. Scanning electron microscopy (SEM) was performed using a Hitachi S-4700 field

TABLE 1

Example 1 aerogel properties.

| sample | No. of repeats, n | diamine | dianhydride | density (g/cm³) | porosity (%) | shrinkage (%) | BET surface area (m2/g) | modulus (Mpa) | onset of decomposition (° C.) | $T_g$ (° C.) |
|---|---|---|---|---|---|---|---|---|---|---|
| 1 | 15 | ODA | BPDA | 0.206 | 88.0 | 24.5 | 377 | 15.9 | 558 | 274 |
| 2 | 20 | ODA | BPDA | 0.194 | 86.7 | 22.4 | 401 | 11.1 | 557 | 267 |
| 3 | 25 | ODA | BPDA | 0.194 | 88.1 | 22.8 | 412 | 12.7 | 548 | 272 |
| 4 | 15 | ODA | BTDA | 0.144 | 90.6 | 20.3 | 469 | 1.0 | 552 | 257 |
| 5 | 20 | ODA | BTDA | 0.167 | 89.5 | 20.3 | 499 | 1.5 | 567 | 271 |
| 6 | 25 | ODA | BTDA | 0.157 | 89.4 | 19.3 | 477 | 0.9 | 565 | 268 |
| 7 | 15 | ODA | BPDA | 0.181 | 90.1 | 21.2 | 425 | 16.9 | 555 | 255 |
| 8 | 20 | ODA | BPDA | 0.196 | 86.2 | 22.1 | 377 | 5.5 | 552 | 272 |
| 9 | 25 | ODA | BPDA | 0.180 | 87.5 | 21.1 | 362 | 12.2 | 550 | 267 |
| 10 | 15 | ODA | BTDA | 0.192 | 87.0 | 23.3 | — | 0.9 | 560 | 278 |
| 11 | 20 | ODA | BTDA | 0.207 | 86.0 | 25.0 | 503 | 2.3 | 550 | 282 |
| 12 | 15 | PPDA | BPDA | 0.318 | 79.8 | 47.8 | 335 | 30.1 | 600 | 346 |
| 13 | 20 | PPDA | BPDA | 0.333 | 77.6 | 47.9 | 329 | 46.1 | 609 | 343 |
| 14 | 25 | PPDA | BPDA | 0.324 | 79.5 | 47.1 | 255 | 19.1 | 593 | — |
| 15 | 15 | PPDA | BTDA | 0.231 | 84.9 | 41.4 | 358 | 27.6 | 566 | 337 |
| 16 | 20 | PPDA | BTDA | 0.210 | 86.2 | 39.7 | 498 | 19.2 | 571 | 321 |
| 17 | 25 | PPDA | BTDA | 0.219 | 85.0 | 40.2 | 461 | 29.2 | 570 | 325 |
| 18 | 30 | DMBZ | BPDA | 0.146 | 89.7 | 19.0 | 314 | 19.1 | 517 | 286 |
| 19 | 30 | DMBZ | BTDA | 0.195 | 87.1 | 27.5 | 442 | 58.4 | 463 | — |
| 20 | 30 | DMBZ | BPDA | 0.131 | 91.6 | 17.1 | 472 | 20.1 | 511 | 293 |
| 21 | 30 | DMBZ | BTDA | 0.181 | 87.6 | 30.1 | 340 | 102 | 470 | — |
| 22 | 30 | ODA | BPDA | 0.207 | 86.3 | 28.7 | 202 | 13.9 | 577 | 292 |

From Table 1 it can be seen that DMBZ, BPDA and TAB combination showed superior properties compared to others. For sample number 20 porosity of the material is around 91.6, density is 0.131 g/cm³ and with less shrinkage while processing (i.e., 17.1%).

Figure 3:
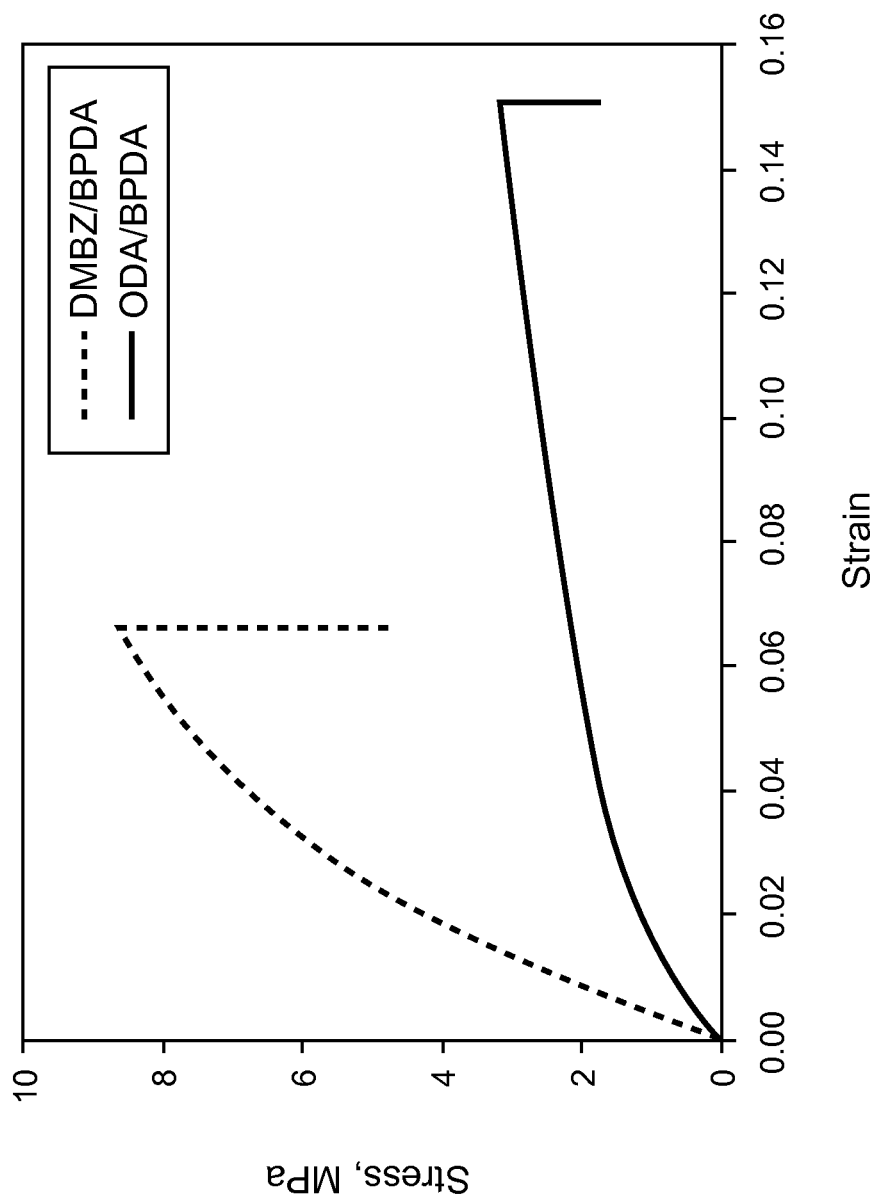
FIG. 3 illustrates a stress-strain curve for various crosslinked polyimide aerogels, in accordance with various embodiments.
Figure 4:
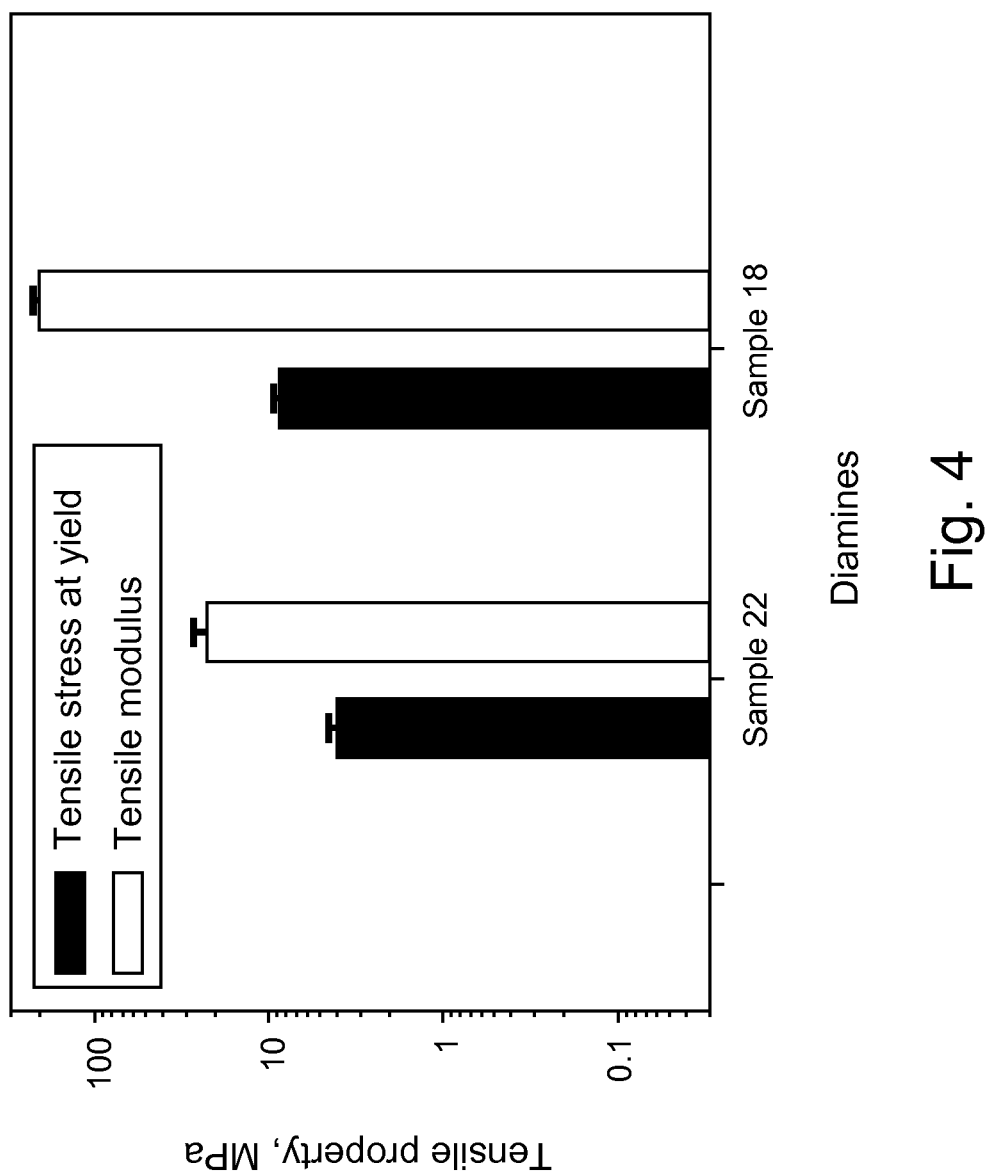
FIG. 4 illustrates tensile stress at yield and tensile modulus for various crosslinked polyimide aerogels, in accordance with various embodiments.

FIG. 3 illustrates a stress-strain curve for Samples 18 and 22. FIG. 4 illustrates a plot showing tensile stress at yield and tensile modulus of Samples 18 and 22. From FIG. 4 it can be seen that Samples 18 and 22 had a tensile strength of emission microscope after sputter-coating the specimens with platinum. Mechanical compression testing was performed following ASTM D695-10 standard as previously described.

Experimental design and analysis were conducted using Design Expert, version 8.1, available from Stat-Ease, Inc. (Minneapolis, Minn., USA). An experimental design with three variables, including diamine (ODA or DMBZ), total polymer concentration (7-10 wt %), and number of repeat units n (10-40) in the amine terminated oligomers, was carried out. A total of 36 separate batches of aerogel were produced in the study as shown in Table 2, including eight repeats scattered randomly throughout the design to assess model reliability and accuracy. Data from the experiments were analyzed using multiple linear regression. A full quadratic equation of the variables, including all two-way interactions, was entertained for each response, and backward stepwise regression was carried out to eliminate terms deemed not significant from the model.

Preparation of BTC Cross-Linked Polyimide Monoliths. The aerogels were fabricated as shown in Scheme 1, starting with synthesis of amine end-capped polyimide oligomers with n repeat units using n equiv of BPDA and n+1 equiv of diamine. The oligomers were crosslinked with BTC to form gels. Concentration of total polymer in the gelation solution (7-10 wt %), type of diamine used (DMBZ or ODA), and number of repeat units in the oligomers (n=10-40) were varied in the fabrication of the aerogels as shown in Table 1. As an example, the procedure for formulation 9 from Table 1 using DMBZ, n=40, and polymer concentration of 7 wt % is carried out as follows: To a solution of DMBZ (3.18 g, 15 mmol) in 80 mL of NMP was added BPDA (4.31 g, 14.6 mmol), and the solution was stirred until fully dissolved. Afterward, acetic anhydride (11.07 mL) was added and stirred until homogeneously mixed, followed by TEA (2.04 mL). After about 15 min, a solution of BTC (0.065 g, 0.24 mmol) in 10 mL of NMP was added to this solution while stirring. Immediately after mixing, the solution was poured into the molds. The solutions gelled after about 10-15 min. The gels were aged for 24 h in the mold and then were extracted into a solution of 75% NMP in acetone and soaked overnight. Afterward, the solvent was replaced by a solution of 25% NMP in acetone and the gels were soaked for another 24 h, followed by three more solvent exchanges in 100% acetone in 24 h intervals. The gels were then converted to aerogels by supercritical fluid extraction. This was accomplished in multiple steps that included subcritical and supercritical $CO_2$ soaking and rinsing. The gels were submerged in acetone in a sealed chamber at 78 bar and 25° C. The chamber was then set in a soak mode for 30 min followed by a subcritical liquid $CO_2$ flush equal to the volume of the chamber and repeated four times. Then the temperature in the chamber was ramped to 35° C. to reach a supercritical state of $CO_2$ and held for 30 min followed by slow venting (10 g/min) for approximately 2 h. This process was then followed by vacuum drying overnight at 75° C. to remove any residual acetone. The resulting aerogels had a density of 0.100 g/cm$^3$ and porosity of 92.6%. Solid $^{13}$C NMR (ppm): 165.3, 136.2, 130.6, 123.4, 18.9. FTIR ($\delta$): 1775.8, 1717.5, 1612.8, 1490.2, 1361.9, 1090.9.

All of the aerogels in this Example were made as described by first dissolving all of the diamine and adding dianhydride, with the exception of those made from 10 wt % solution and a 50/50 combination of ODA and DMBZ as diamine. These were made by dissolving ODA in solution first, followed by all of the dianhydride. After the dianhydride was completely dissolved, DMBZ was added. This forces the oligomer to have a backbone structure where the diamines are alternating instead of random.

Figure 5A:
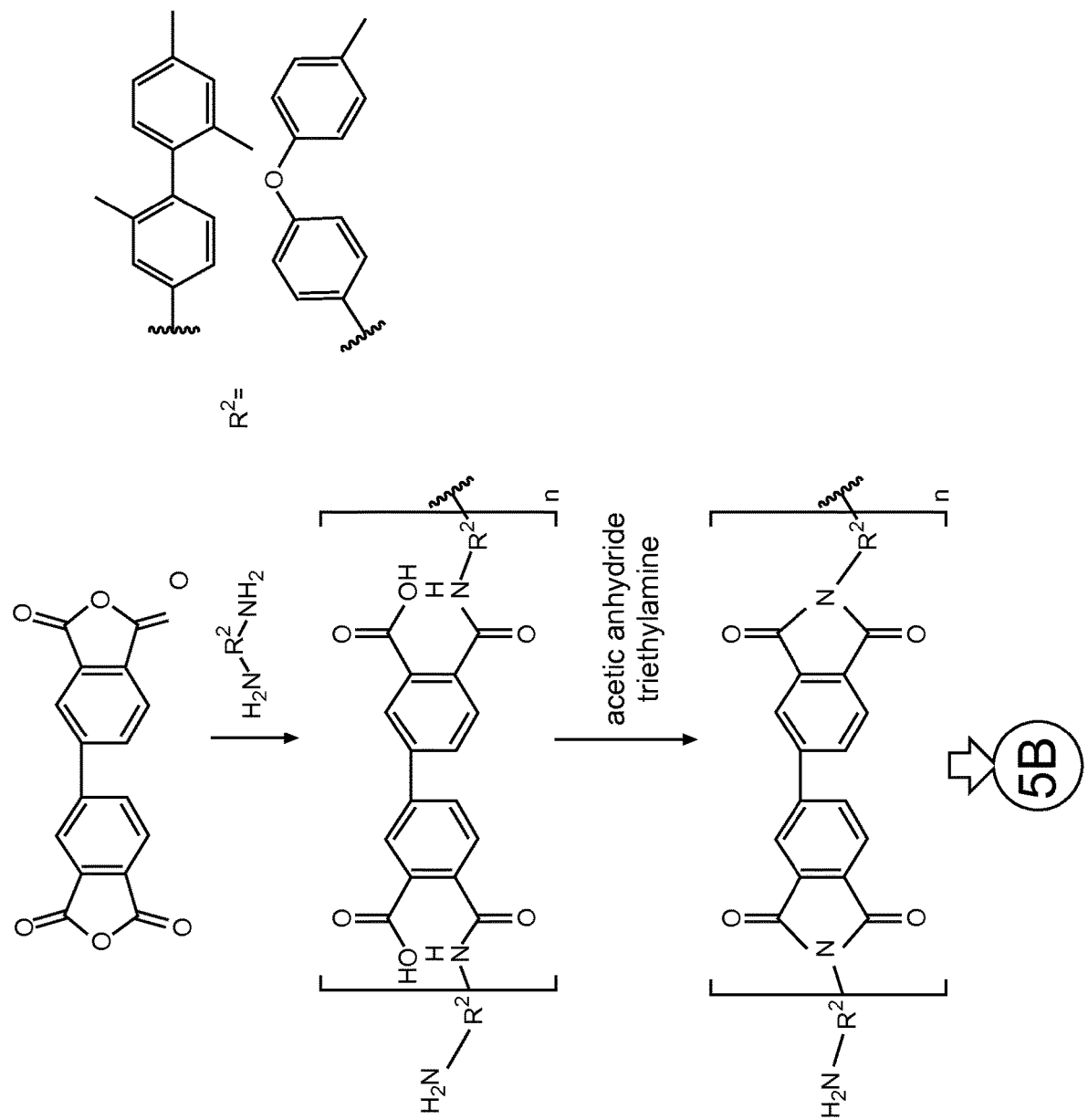
FIGS. 5A-B illustrates a synthetic scheme for synthesis of polyimide aerogels with a triamide crosslinker, in accordance with various embodiments.
Figure 5B:
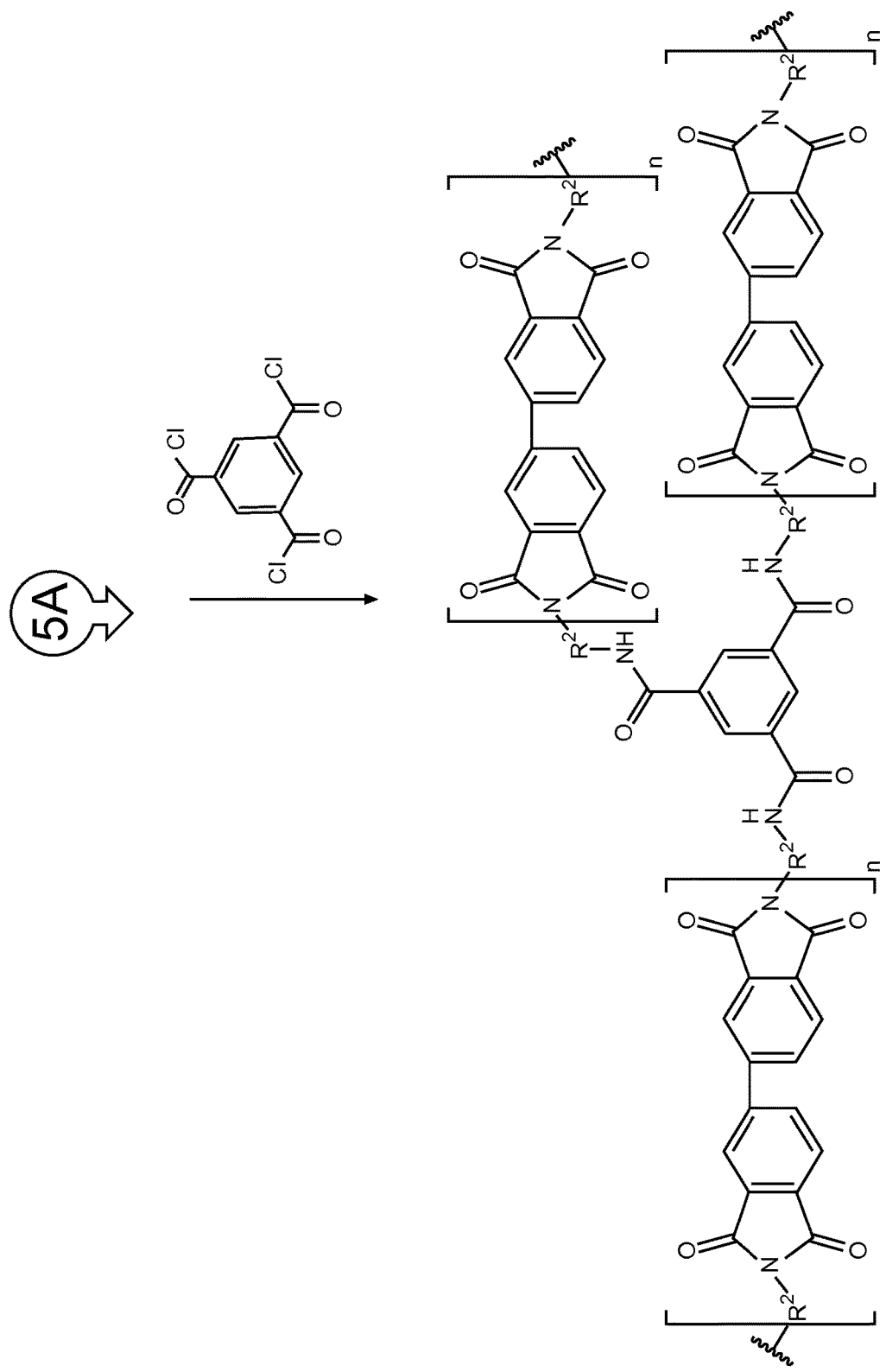

A schematic of the synthesis is shown in FIGS. 5A-B.

The aerogels had the properties shown in Table 2.

TABLE 2

Properties of the aerogels of Example 2.

| sample | n | diamine | polymer concn, wt % | density, g/cm$^3$ | porosity, % | surface, area, m$^2$/g | modulus, MPa | stress at 10% strain (MPa) | onset of decopmosition, ° C. |
|---|---|---|---|---|---|---|---|---|---|
| 1 | 30 | DMBZ | 10.0 | 0.132 | 90.2 | 513 | 45.4 | 1.5 | 510.2 |
| 2 | 10 | DMBZ | 10.0 | 0.108 | 92.0 | 526 | — | — | 500.0 |
| 3 | 30 | ODA | 10.0 | 0.153 | 90.0 | 405 | 28.8 | 0.87 | 598.7 |
| 4 | 10 | ODA | 10.0 | 0.123 | 91.3 | 440 | 18.6 | a | 602.5 |
| 5 | 30 | DMBZ | 7.0 | 0.097 | 92.9 | 550 | 24.0 | 0.67 | 510.9 |
| 6 | 10 | DMBZ | 7.0 | 0.077 | 94.3 | 539 | 11.0 | 0.36 | 526.3 |
| 7 | 30 | ODA | 7.0 | 0.120 | 92.1 | 418 | 12.6 | 0.48 | 594.0 |
| 8 | 10 | ODA | 7.0 | 0.090 | 94.1 | 466 | 12.0 | — | 592.2 |
| 9 | 40 | DMBZ | 7.0 | 0.100 | 92.6 | 555 | 40.5 | 0.76 | 514.6 |
| 10 | 40 | ODA | 7.0 | 0.138 | 90.5 | 382 | 18.3 | 0.64 | 591.9 |
| 11 | 40 | DMBZ | 10.0 | 0.138 | 89.8 | 542 | 74.8 | 1.65 | 515.9 |
| 12 | 30 | ODA | 8.5 | 0.142 | 91.3 | 409 | 27.6 | 0.69 | 598.1 |
| 13 | 30 | ODA | 8.5 | 0.142 | 89.8 | 406 | 19.7 | 0.64 | 587.3 |
| 14 | 30 | DMBZ | 8.5 | 0.110 | 91.5 | 560 | 40.9 | 0.97 | 514.6 |
| 15 | 30 | ODA | 8.5 | 0.135 | 89.8 | 409 | 16.3 | 0.61 | 584.1 |
| 16 | 30 | DMBZ | 8.5 | 0.112 | 92.1 | 578 | 48.3 | 1.05 | 516.7 |
| 17 | 20 | DMBZ | 10.0 | 0.128 | 89.9 | 546 | 48.5 | 1.35 | 511.1 |
| 18 | 30 | DMBZ | 8.5 | 0.116 | 91.8 | 531 | 27.2 | 1.11 | 513.3 |
| 19 | 20 | DMBZ | 8.5 | 0.108 | 91.5 | 556 | 28.4 | 0.92 | 507.9 |
| 20 | 30 | ODA | 8.5 | 0.142 | 89.5 | 395 | 48.3 | 0.66 | 580.0 |
| 21 | 20 | DMBZ | 7.0 | 0.096 | 92.4 | 571 | 37.6 | 0.65 | 515.6 |
| 22 | 40 | ODA | 8.5 | 0.157 | 88.4 | 444 | 22.0 | 0.81 | 583.9 |
| 23 | 20 | ODA | 10.0 | 0.157 | 88.8 | 388 | 21.6 | 0.82 | 588.1 |
| 24 | 30 | DMBZ | 8.5 | 0.116 | 91.5 | 558 | 70.4 | 1.10 | 510.3 |
| 25 | 20 | ODA | 7.0 | 0.119 | 91.6 | 423 | 21.3 | 0.45 | 591.6 |
| 26 | 40 | ODA | 10.0 | 0.177 | 87.4 | 374 | 37.6 | 1.08 | 589.1 |
| 27 | 20 | ODA | 8.5 | 0.127 | 90.5 | 397 | 17.6 | 0.56 | 599.4 |
| 28 | 30 | DMBZ | 8.5 | 0.111 | 91.6 | 548 | 34.3 | 1.04 | 515.5 |
| 29 | 30 | ODA | 8.5 | 0.145 | 89.6 | 379 | 25.5 | 0.74 | 586.5 |
| 30 | 40 | DMBZ | 8.5 | 0.120 | 90.8 | 488 | 38.0 | 1.16 | 520.9 |
| 31 | 20 | DMBZ/ODA | 7.0 | 0.085 | 94.4 | 504 | 11.9 | 0.39 | 531.52 |
| 32 | 30 | DMBZ/ODA | 7.0 | 0.092 | 93.5 | 476 | 15.4 | 0.47 | — |
| 33 | 40 | DMBZ/ODA | 7.0 | 0.091 | 93.9 | 477 | 22.5 | 0.44 | 535.86 |
| 34 | 20 | DMBZ/ODA | 10.0 | 0.120 | 88.1 | 493 | 28.5 | 0.77 | 544.75 |

Both mechanical and physical properties of the proposed amide crosslinked polyimide aerogels were similar to those of the amine-based aerogels of Example 1.

Example 3. Preparation of hollow microspheres (hypothetical).

An aromatic polyimide precursor solid residuum is first prepared, which is an admixture of an aromatic compound (A), which is an aromatic dianhydride or a derivative of an aromatic dianhydride, and an aromatic compound (B), which is an aromatic diamine or a derivative of an aromatic diamine, plus a complexing agent (C), which is complexed with the admixture by hydrogen bonding, with the complexing agent (C) being present in an amount sufficient to provide from about 1 to about 15% by weight, based on the total weight of the polyimide precursor solid residuum. The aromatic polyimide precursor solid residuum is charged into a non-confined vessel. The aromatic polyimide precursor solid residuum is heated in the non-confined vessel to a temperature between about 100° C. and 200° C. to produce a multiplicity of shaped articles from the aromatic polyimide precursor solid residuum in the non-confined vessel. The multiplicity of shaped articles are heated to a temperature between about 200° C. and 300° C. to produce a multiplicity of thermally imidized shaped articles. The multiplicity of thermally imidized shaped articles are then cooled for subsequent utilization.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in the subterranean formation a proppant comprising a crosslinked polymer.

Embodiment 2 provides the method of Embodiment 1, wherein a composition comprises the proppant, wherein placing the proppant in the subterranean formation comprises placing the composition in the subterranean formation.

Embodiment 3 provides the method of Embodiment 2, wherein the method further comprises obtaining or providing the composition, wherein the obtaining or providing of the composition occurs above-surface.

Embodiment 4 provides the method of any one of Embodiments 2-3, wherein the method further comprises obtaining or providing the composition, wherein the obtaining or providing of the composition occurs in the subterranean formation.

Embodiment 5 provides the method of any one of Embodiments 2-4, wherein the composition comprises a fracturing fluid.

Embodiment 6 provides the method of any one of Embodiments 1-5, wherein the proppant has a tensile strength of about 1 MPa to about 100 MPa.

Embodiment 7 provides the method of any one of Embodiments 1-6, wherein the proppant has a tensile strength of about 5 MPa to about 20 MPa.

Embodiment 8 provides the method of any one of Embodiments 1-7, wherein the proppant has a compressive strength of about 1 MPa to about 10,000 MPa.

Embodiment 9 provides the method of any one of Embodiments 1-8, wherein the proppant has a compressive strength of about 50 MPa to about 300 MPa.

Embodiment 10 provides the method of any one of Embodiments 1-9, wherein the proppant has a density of about 0.1 g/cm$^3$ to about 3 g/cm$^3$.

Embodiment 11 provides the method of any one of Embodiments 1-10, wherein the proppant has a density of about 0.2 g/cm$^3$ to about 2.3 g/cm$^3$.

Embodiment 12 provides the method of any one of Embodiments 1-11, wherein the proppant comprises particles having a density lower than 1.0 g/cm$^3$ and particles having a density greater than 1.0 g/cm$^3$.

Embodiment 13 provides the method of any one of Embodiments 2-12, wherein the composition is free of viscosifiers.

Embodiment 14 provides the method of any one of Embodiments 2-13, wherein the composition is free of cross-linked viscosifiers.

Embodiment 15 provides the method of any one of Embodiments 2-14, wherein the composition comprises a linear crosslinker.

Embodiment 16 provides the method of any one of Embodiments 2-15, further comprising placing a pad fluid comprising a cross-linked viscosifier in the subterranean formation before or after placing the composition comprising the proppant in the subterranean formation.

Embodiment 17 provides the method of any one of Embodiments 2-16, further comprising repeatedly and sequentially placing a pad fluid comprising a cross-linked viscosifier and the composition comprising the proppant in the subterranean formation.

Embodiment 18 provides the method of any one of Embodiments 1-17, wherein the proppant further comprises a filler.

Embodiment 19 provides the method of any one of Embodiments 1-18, wherein the filler has a particle size of about 1 nm to about 1 mm.

Embodiment 20 provides the method of any one of Embodiments 1-19, wherein the filler has a particle size of about 1 nm to about 1000 nm.

Embodiment 21 provides the method of any one of Embodiments 1-20, wherein the proppant has a particle size of about 1 nm to about 10 mm.

Embodiment 22 provides the method of any one of Embodiments 1-21, wherein the proppant has a particle size of about 500 nm to about 3 mm.

Embodiment 23 provides the method of any one of Embodiments 1-22, wherein the proppant is substantially spherical.

Embodiment 24 provides the method of any one of Embodiments 1-23, wherein the proppant is hollow.

Embodiment 25 provides the method of any one of Embodiments 1-24, wherein the crosslinked polymer is about 0.01 wt % of the proppant to about 100 wt % of the proppant.

Embodiment 26 provides the method of any one of Embodiments 1-25, wherein the crosslinked polymer is about 80 wt % to about 100 wt % of the proppant.

Embodiment 27 provides the method of any one of Embodiments 1-26, wherein the crosslinked polymer is selected from the group consisting of a crosslinked polyimide, a crosslinked epoxy-based material, a crosslinked furan-based resin, a crosslinked polyacrylate, a crosslinked vinyl polymer, a crosslinked polyaryl ether sulfone, and combinations thereof.

Embodiment 28 provides the method of any one of Embodiments 1-27, wherein the crosslinked polymer is an aerogel.

Embodiment 29 provides the method of any one of Embodiments 1-28, wherein the crosslinked polymer is a crosslinked polyimide.

Embodiment 30 provides the method of Embodiment 29, wherein the proppant comprises at least one other polymer in addition to the crosslinked polyimide.

Embodiment 31 provides the method of Embodiment 30, wherein the at least one other polymer is selected from the group consisting of a crosslinked polyimide, a crosslinked epoxy-based material, a crosslinked furan-based resin, a crosslinked polyacrylate, a crosslinked vinyl polymer, a polyaryl ether sulfone, and combinations thereof.

Embodiment 32 provides the method of any one of Embodiments 29-31, wherein the crosslinked polyimide is selected from the group consisting of a triamine-crosslinked polyimide and a triamide-crosslinked polyimide.

Embodiment 33 provides the method of any one of Embodiments 29-32, wherein the crosslinked polyimide comprises a repeating group having the structure:

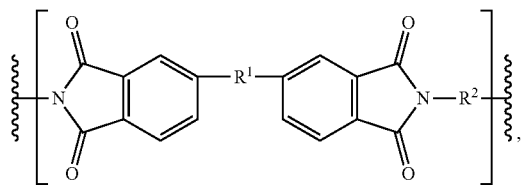

wherein
at each occurrence, $R^1$ is independently selected from the group consisting of a bond and —C(O)—,
at each occurrence, $R^2$ is independently a substituted or unsubstituted $(C_1-C_{20})$hydrocarbyl interrupted by 0, 1, 2, or 3 groups independently selected from the group consisting of —O—, —S—, and substituted or unsubstituted —NH—.

Embodiment 34 provides the method of Embodiment 33, wherein $R^1$ is a bond.

Embodiment 35 provides the method of any one of Embodiments 33-34, wheiren $R^1$ is —C(O)—.

Embodiment 36 provides the method of any one of Embodiments 33-35, wherein $R^2$ is selected from the group consisting of $(C_4-C_{10})$aryl and —$(C_4-C_{10})$aryl-O—$(C_4-C_{10})$aryl-, wherein each $(C_4-C_{10})$aryl is independently substituted or unsubstituted.

Embodiment 37 provides the method of any one of Embodiments 33-36, wherein $R^2$ is selected from the group consisting of -phenyl-, and -phenyl-O-phenyl-, wherein each phenyl is independently substituted or unsubstituted.

Embodiment 38 provides the method of any one of Embodiments 33-37, wherein $R^2$ is selected from the group consisting of:

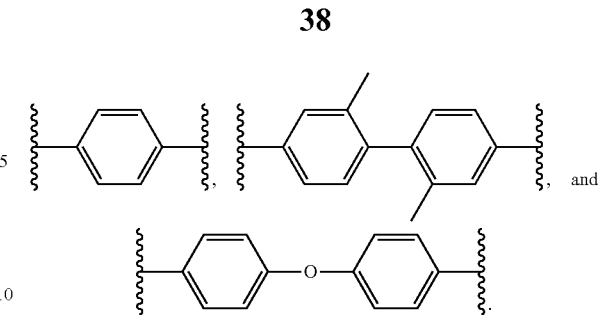

Embodiment 39 provides the method of any one of Embodiments 33-38, wherein the crosslinked polyimide has the structure A-$P^1$—$R^2$-A, wherein $P^1$ has the structure:

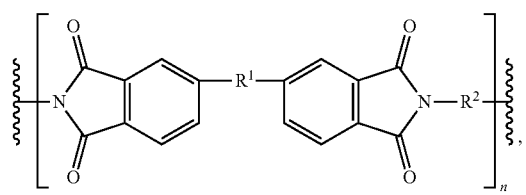

wherein
at each occurrence, A is selected from the group consisting of:

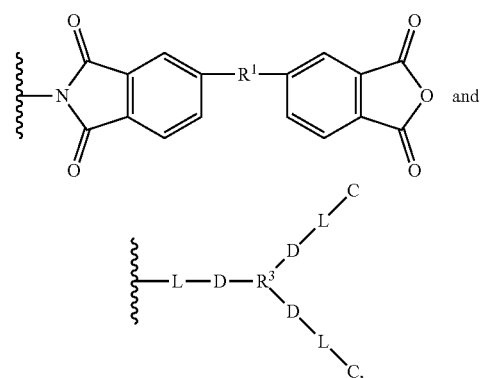

at each occurrence, C is independently selected from the group consisting of —$NH_2$, -A, and —$P^1$—$R^2$-A,
at each occurrence, D is independently selected from the group consisting of a bond, —O—, —NH—, —C(O)—O—, and —C(O)—NH—, at each occurrence, L is independently selected from the group consisting of a bond, a substituted or unsubstituted $(C_1-C_{20})$hydrocarbylene interrupted by 0, 1, 2, or 3 groups independently selected from the group consisting of —O—, —S—, and substituted or unsubstituted —NH—,
at each occurrence, $R^3$ is independently a trivalent substituted or unsubstituted $(C_1-C_{20})$hydrocarbyl interrupted by 0, 1, 2, or 3 groups independently selected from the group consisting of —O—, —S—, and substituted or unsubstituted —NH—, and at each occurrence, n is independently about 2 to about 100,000,000.

Embodiment 40 provides the method of Embodiment 39, wherein A is:

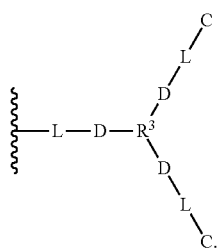

Embodiment 41 provides the method of any one of Embodiments 39-40, wherein at each occurrence, C is independently selected from the group consisting of -A and —P¹—R²-A.

Embodiment 42 provides the method of any one of Embodiments 39-41, wherein D is selected from the group consisting of —O— and —C(O)—NH—.

Embodiment 43 provides the method of any one of Embodiments 39-42, wherein D is —O—.

Embodiment 44 provides the method of any one of Embodiments 39-43, wherein D is —C(O)—NH—, wherein the C(O) of the —C(O)—NH— is closer to R³ than the —NH— of the —C(O)—NH—.

Embodiment 45 provides the method of any one of Embodiments 39-44, wherein L is selected from the group consisting of $(C_4-C_{10})$arylene and -$(C_4-C_{10})$arylene-O-$(C_4-C_{10})$arylene-, wherein each $(C_4-C_{10})$arylene is independently substituted or unsubstituted.

Embodiment 46 provides the method of any one of Embodiments 39-45, wherein L is selected from the group consisting of -phenylene-, and -phenylene-O-phenylene-, wherein each phenyl is independently substituted or unsubstituted.

Embodiment 47 provides the method of any one of Embodiments 39-46, wherein L is selected from the group consisting of:

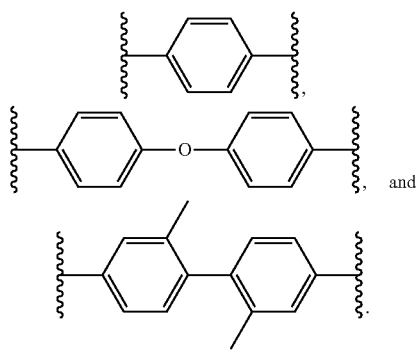

Embodiment 48 provides the method of any one of Embodiments 39-47, wherein at each occurrence, L is selected from the group consisting of:

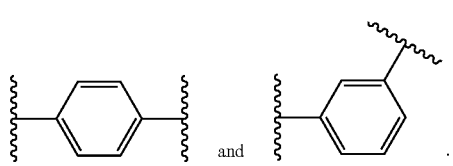 [SMILES: *c1ccc(*)cc1 ; *c1cccc(*)c1]

Embodiment 49 provides the method of any one of Embodiments 39-48, wherein L is selected from the group consisting of:

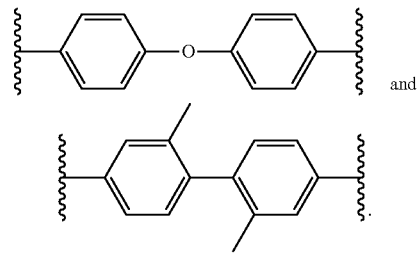

Embodiment 50 provides the method of any one of Embodiments 39-49, wherein R³ is a trivalent substituted or unsubstituted $(C_4-C_{10})$aryl.

Embodiment 51 provides the method of any one of Embodiments 39-50, wherein R³ is trivalent phenyl.

Embodiment 52 provides the method of any one of Embodiments 39-51, wherein R³ is trivalent phenyl substituted at the 1, 3, and 5-positions by the -D-L-C group.

Embodiment 53 provides the method of any one of Embodiments 39-52, wherein L is selected from the group consisting of:

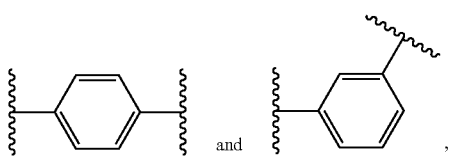 [SMILES: *c1ccc(*)cc1 ; *c1cccc(*)c1]

D is —O—, and

R³ is trivalent phenyl substituted at the 1, 3, and 5-positions by the -D-L-C.

Embodiment 54 provides the method of any one of Embodiments 39-53, wherein L is selected from the group consisting of:

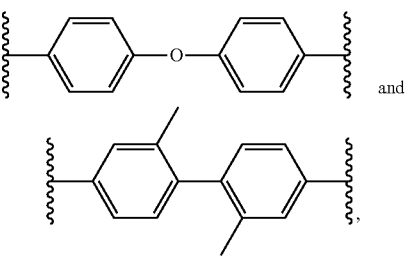

D is —C(O)—NH—, wherein the C(O) of the —C(O)—NH— is closer to R³ than the —NH— of the —C(O)—NH—, and R³ is trivalent phenyl substituted at the 1, 3, and 5-positions by the -D-L-C.

Embodiment 55 provides the method of any one of Embodiments 1-54, wherein the crosslinked polymer is a crosslinked polyimide having the structure A-P¹—R²-A, wherein P¹ has the structure:

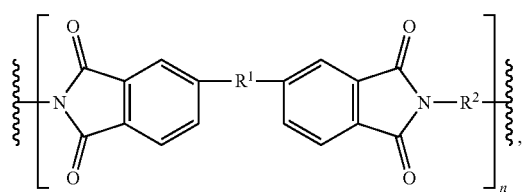

wherein at each occurrence, A is selected from the group consisting of:

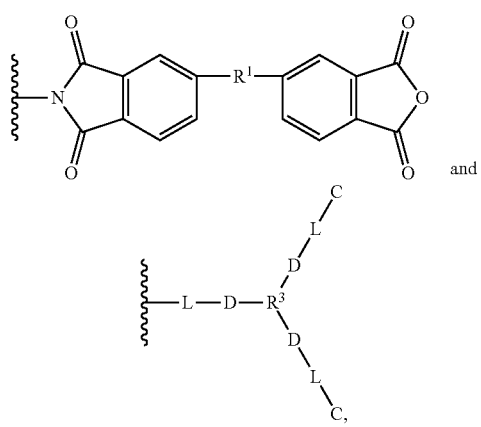

at each occurrence, C is independently selected from the group consisting of —NH$_2$, -A, and —P$^1$—R$^2$-A, R$^1$ is selected from the group consisting of a bond and —C(O)—, R$^2$ is selected from the group consisting of:

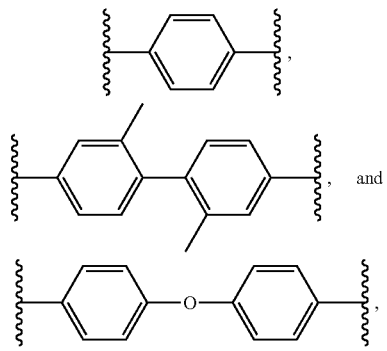

D is —O—,

L is selected from the group consisting of:

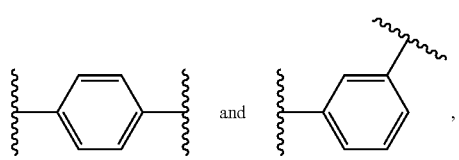 [SMILES: *c1ccc(*)cc1 ; *c1cccc(*)c1]

R$^3$ is trivalent phenyl substituted at the 1, 3, and 5-positions by the -D-L-C, and at each occurrence, n is independently about 2 to about 100,000,000.

Embodiment 56 provides the method of any one of Embodiments 1-55, wherein the crosslinked polyimide has the structure A-P$^1$—R$^2$-A, wherein P$^1$ has the structure:

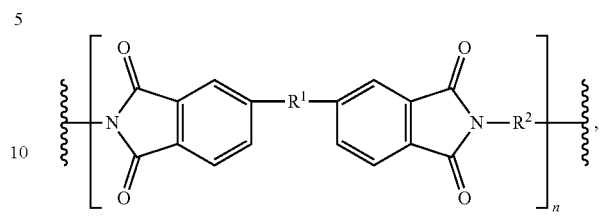

wherein at each occurrence, A is selected from the group consisting of:

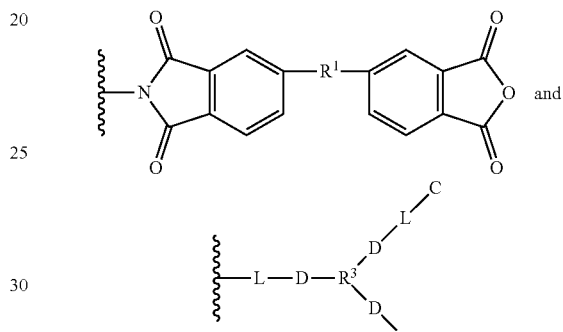

at each occurrence, C is independently selected from the group consisting of —NH$_2$, -A, and —P$^1$—R$^2$-A, R$^1$ is a bond, R$^2$ is selected from the group consisting of:

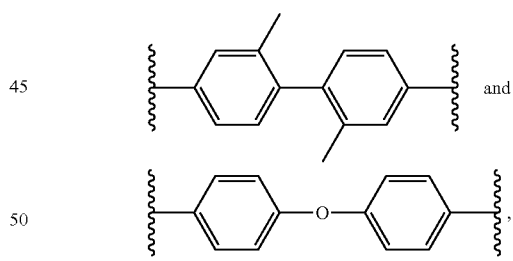

D is —C(O)—NH—, wherein the C(O) of the —C(O)—NH— is closer to R$^3$ than the —NH— of the —C(O)—NH—, at each occurrence, L is independently selected from the group consisting of:

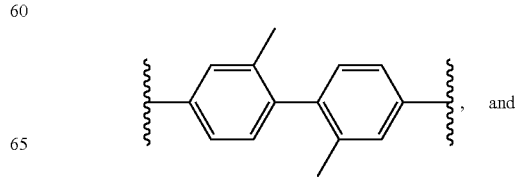

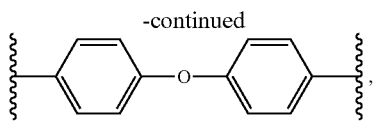

$R^3$ is trivalent phenyl substituted at the 1, 3, and 5-positions by the -D-L-C, and at each occurrence, n is independently about 2 to about 100,000,000.

Embodiment 57 provides the method of any one of Embodiments 2-56, wherein the composition is a stimulation fluid, a fracturing fluid, a remedial treatment fluid, an acidizing fluid, a logging fluid, or a combination thereof.

Embodiment 58 provides the method of any one of Embodiments 2-57, wherein at least one of prior to, during, and after the placing of the composition in the subterranean formation, the composition is used in the subterranean formation, at least one of alone and in combination with other materials, as a stimulation fluid, a fracturing fluid, a remedial treatment fluid, an acidizing fluid, a logging fluid, or a combination thereof.

Embodiment 59 provides the method of any one of Embodiments 2-58, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 60 provides the method of any one of Embodiments 2-59, wherein the placing of the composition in the subterranean formation comprises fracturing at least part of the subterranean formation to form at least one subterranean fracture.

Embodiment 61 provides the method of any one of Embodiments 2-60, wherein the placing of the composition in the subterranean formation comprises pumping the composition through a tubular disposed in a wellbore and into the subterranean formation.

Embodiment 62 provides a system for performing the method of any one of Embodiments 2-61, the system comprising:

a tubular disposed in the subterranean formation; and a pump configured to pump the composition in the subterranean formation through the tubular.

Embodiment 63 provides a method of treating a subterranean formation, the method comprising:

placing in the subterranean formation a proppant comprising a crosslinked polyimide having the structure A-P$^1$—R$^2$-A, wherein P$^1$ has the structure:

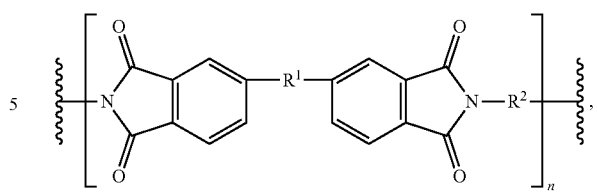

wherein
at each occurrence, A is selected from the group consisting of:

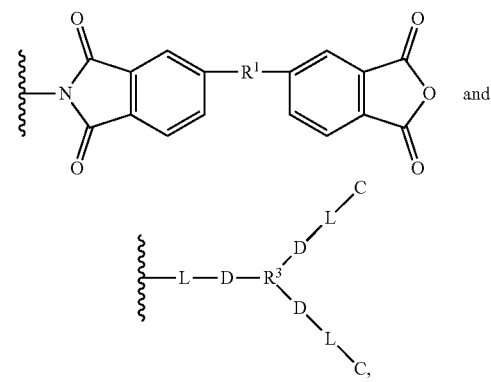

at each occurrence, R$^1$ is independently selected from the group consisting of a bond and —C(O)—, at each occurrence, R$^2$ is independently a substituted or unsubstituted (C$_1$-C$_{20}$)hydrocarbyl interrupted by 0, 1, 2, or 3 groups independently selected from the group consisting of —O—, —S—, and substituted or unsubstituted —NH—, at each occurrence, C is independently selected from the group consisting of —NH$_2$, -A, and —P$^1$—R$^2$-A, at each occurrence, D is independently selected from the group consisting of a bond, —O—, —NH—, —C(O)—O—, and —C(O)—NH—, at each occurrence, L is independently selected from the group consisting of a bond, a substituted or unsubstituted (C$_1$-C$_{20}$)hydrocarbylene interrupted by 0, 1, 2, or 3 groups independently selected from the group consisting of —O—, —S—, and substituted or unsubstituted —NH—, at each occurrence, R$^3$ is independently a trivalent substituted or unsubstituted (C$_1$-C$_{20}$)hydrocarbyl interrupted by 0, 1, 2, or 3 groups independently selected from the group consisting of —O—, —S—, and substituted or unsubstituted —NH—, and at each occurrence, n is independently about 2 to about 100,000,000.

Embodiment 64 provides a method of treating a subterranean formation, the method comprising:

placing in the subterranean formation a proppant comprising a crosslinked polyimide having the structure A-P$^1$—R$^2$-A, wherein P$^1$ has the structure:

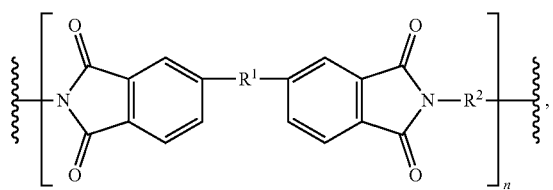

wherein
at each occurrence, A is selected from the group consisting of:

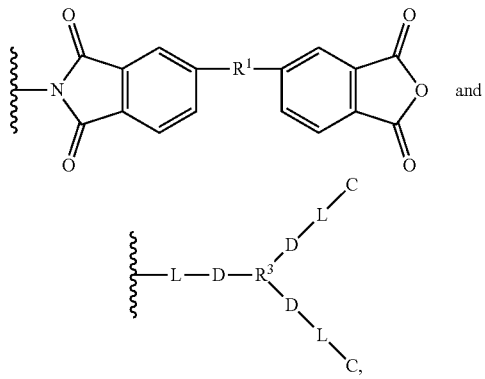

and $R^1$ is independently selected from the group consisting of a bond and —C(O)—, $R^2$ is selected from the group consisting of:

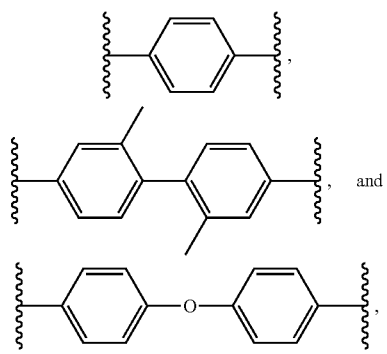

and at each occurrence, C is independently selected from the group consisting of —NH$_2$, -A, and —P$^1$—R$^2$-A, D is independently selected from the group consisting of —O— and —C(O)—NH—, at each occurrence, L is independently selected from the group consisting of:

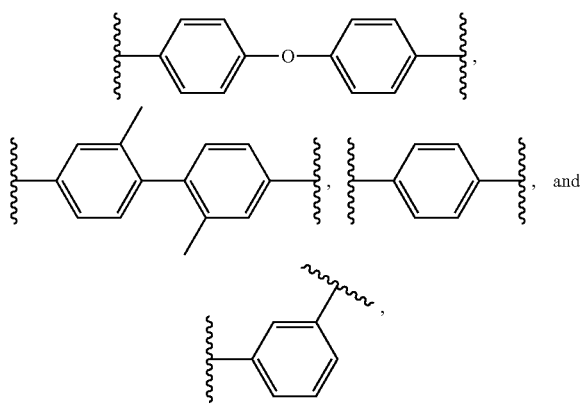

$R^3$ is trivalent phenyl substituted at the 1, 3, and 5-positions by the -D-L-C, and at each occurrence, n is independently about 2 to about 100,000,000.

Embodiment 65 provides a system comprising:
a tubular disposed in a subterranean formation; and
a pump configured to pump a composition comprising a proppant comprising a crosslinked polymer in the subterranean formation through the tubular.

Embodiment 66 provides a proppant for treatment of a subterranean formation, the proppant comprising:
a crosslinked polymer.

Embodiment 67 provides a composition comprising the proppant of Embodiment 66, wherein the composition comprises a stimulation fluid, a fracturing fluid, a remedial treatment fluid, an acidizing fluid, a logging fluid, or a combination thereof.

Embodiment 68 provides a proppant for treatment of a subterranean formation, the proppant comprising:
a crosslinked polyimide having the structure A-P$^1$—R$^2$-A, wherein P$^1$ has the structure:

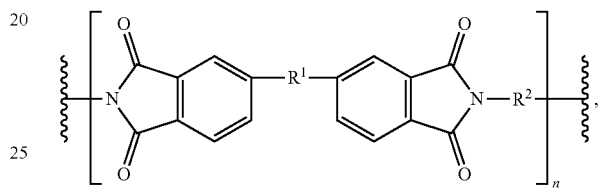

wherein
at each occurrence, A is selected from the group consisting of:

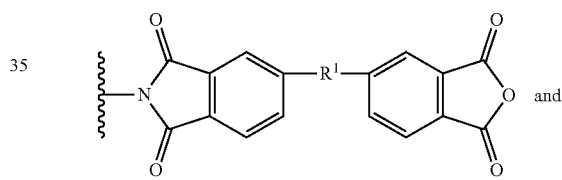

and

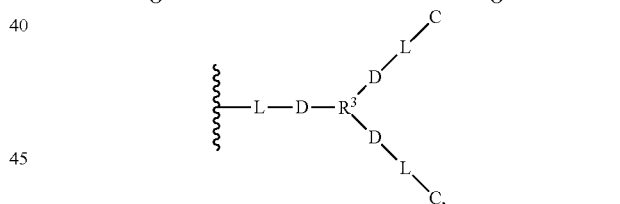

at each occurrence, R$^1$ is independently selected from the group consisting of a bond and —C(O)—, at each occurrence, R$^2$ is independently a substituted or unsubstituted (C$_1$-C$_{20}$)hydrocarbyl interrupted by 0, 1, 2, or 3 groups independently selected from the group consisting of —O—, —S—, and substituted or unsubstituted —NH—, at each occurrence, C is independently selected from the group consisting of —NH$_2$, -A, and —P$^1$—R$^2$-A, at each occurrence, D is independently selected from the group consisting of a bond, —O—, —NH—, —C(O)—O—, and —C(O)—NH—, at each occurrence, L is independently selected from the group consisting of a bond, a substituted or unsubstituted (C$_1$-C$_{20}$)hydrocarbylene interrupted by 0, 1, 2, or 3 groups independently selected from the group consisting of —O—, —S—, and substituted or unsubstituted —NH—, at each occurrence, R$^3$ is independently a trivalent substituted or unsubstituted (C$_1$-C$_{20}$)hydrocarbyl interrupted by 0, 1, 2, or 3 groups independently selected from the group consisting of —O—, —S—, and substituted or unsubstituted —NH—, and at each occurrence, n is independently about 2 to about 100,000,000.

Embodiment 69 provides a method of preparing a proppant for treatment of a subterranean formation, the method comprising:
forming a proppant comprising a crosslinked polymer.

Embodiment 70 provides the method, system, or composition of any one or any combination of Embodiments 1-69 optionally configured such that all elements or options recited are available to use or select from.

What is claimed is:

1. A method of treating a subterranean formation, comprising:
    placing in secondary fractures in the subterranean formation a composition comprising a proppant comprising a crosslinked polymer and having a particle size less than or equal to 100 microns, wherein the composition is a linear pad fluid or a slickwater fluid, and
    wherein the proppant comprises particles having a density less than 1.0 g/cm³ and particles having a density greater than 1.0 g/cm³; and
    repeatedly and sequentially placing a cross-linked pad fluid and the composition in the subterranean formation to provide the formation of both dominant fractures and the secondary fractures and to avoid the closure of the secondary fractures via the placing of the composition.

2. The method of claim 1, wherein the proppant comprises particles having a density of about 0.2 g/cm³ to less than 1.0 g/cm³ and particles having a density greater than 1.0 g/cm³ to about 2.3 g/cm³.

3. The method of claim 1, wherein the proppant has a tensile strength of about 5 MPa to about 20 MPa, and wherein the proppant has a compressive strength of about 50 MPa to about 300 MPa.

4. The method of claim 1, wherein the composition is the slickwater fluid.

5. The method of claim 1, wherein the particles having a density less than 1.0 g/cm³ and the particles having a density greater than 1.0 g/cm³ are hollow.

6. The method of claim 1, wherein the crosslinked polymer is about 80 wt % to about 100 wt % of the proppant.

7. The method of claim 1, wherein the crosslinked polymer is a crosslinked polyimide, and wherein the proppant comprises at least one other polymer in addition to the crosslinked polyimide.

8. The method of claim 7, wherein the at least one other polymer is selected from the group consisting of another crosslinked polyimide, a crosslinked epoxy-based material, a crosslinked furan-based resin, a crosslinked polyacrylate, a crosslinked vinyl polymer, a polyaryl ether sulfone, and combinations thereof.

9. The method of claim 7, wherein the crosslinked polyimide comprises a repeating group having the structure:

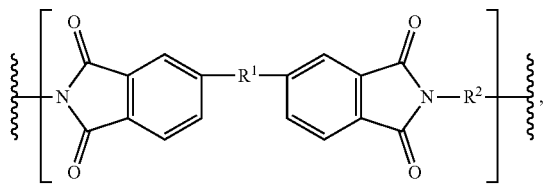

wherein:
    at each occurrence, R¹ is independently selected from the group consisting of a bond and —C(O)—,
    at each occurrence, R² is independently a substituted or unsubstituted (C₁-C₂₀)hydrocarbyl interrupted by 0, 1, 2, or 3 groups independently selected from the group consisting of —O—, —S—, and substituted or unsubstituted —NH—.

10. The method of claim 9, wherein R² is selected from the group consisting of:

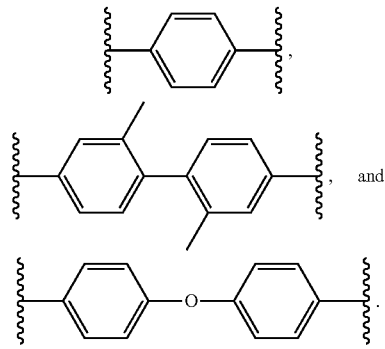

11. The method of claim 9, wherein the crosslinked polyimide has the structure A-P¹—R²-A, wherein P¹ has the structure:

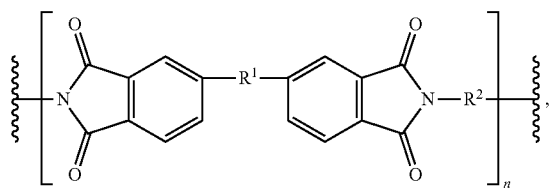

wherein
at each occurrence, A is selected from the group consisting of:

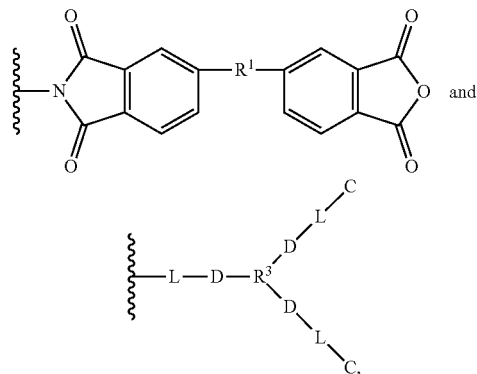

at each occurrence, C is independently selected from the group consisting of —NH₂, -A, and —P¹—R²-A,
at each occurrence, D is independently selected from the group consisting of a bond, —O—, —NH—, —C(O)—O—, and —C(O)—NH—,
at each occurrence, L is independently selected from the group consisting of a bond, a substituted or unsubstituted (C$_1$-C$_{20}$)hydrocarbylene interrupted by 0, 1, 2, or 3 groups independently selected from the group consisting of —O—, —S—, and substituted or unsubstituted —NH—, at each occurrence, R$^3$ is independently a trivalent substituted or unsubstituted (C$_1$-C$_{20}$)hydrocarbyl interrupted by 0, 1, 2, or 3 groups independently selected from the group consisting of —O—, —S—, and substituted or unsubstituted —NH—, and at each occurrence, n is independently 2 to about 100,000,000.

12. The method of claim 11, wherein at each occurrence, C is independently selected from the group consisting if -A and P$^1$—R$^2$-A.

13. The method of claim 11, wherein L is selected from the group consisting of -phenylene-, and -phenylene-O-phenylene-, and wherein each phenyl is independently substituted or unsubstituted.

14. The method of claim 11, wherein:
L is selected from the group consisting of:

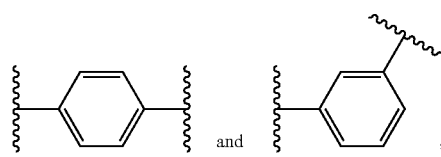 [SMILES: *c1ccc(*)cc1 ; *c1cccc(*)c1]

D is —O—, and
R$^3$ is trivalent phenyl substituted at the 1, 3, and 5-positions by the -D-L-C.

15. The method of claim 11, wherein:
L is selected from the group consisting of:

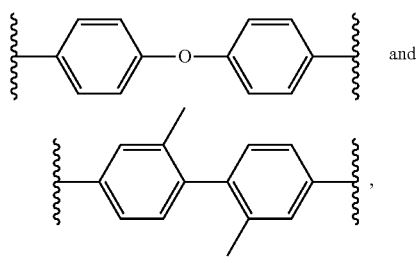

D is —C(O)—NH—, wherein the C(O) of the —C(O)—NH— is closer to R$^3$ than the —NH— of the —C(O)—NH—, and
R$^3$ is trivalent phenyl substituted at the 1, 3, and 5-positions by the -D-L-C.

16. The method of claim 1, wherein the crosslinked polymer is a crosslinked polyimide having the structure A-P$^1$—R$^2$-A, wherein P$^1$ has the structure:

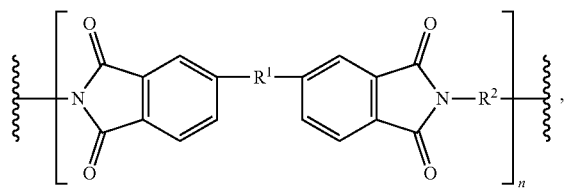

wherein:
at each occurrence, A is selected from the group consisting of:

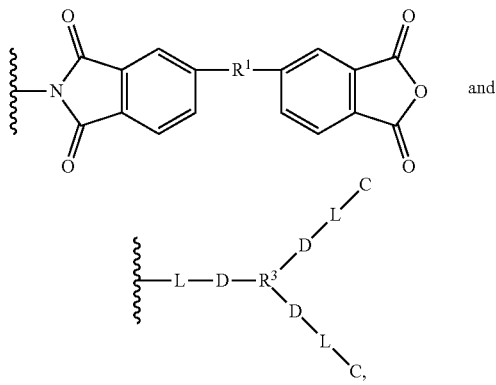

at each occurrence, C is independently selected from the group consisting of—NH$_2$, -A, and —P$^1$—R$^2$-A,
R$^1$ is selected from the group consisting of a bond and —C(O)—,
R$^2$ is selected from the group consisting of:

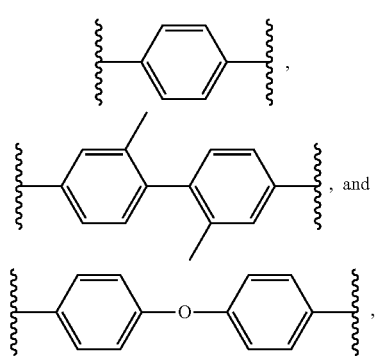

D is —O—,
L is selected from the group consisting of:

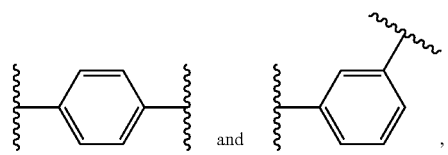 [SMILES: *c1ccc(*)cc1 ; *c1cccc(*)c1]

R$^3$ is trivalent phenyl substituted at the 1, 3, and 5-positions by the -D-L-C, and
at each occurrence, n is independently 2 to about 100,000,000.

17. The method of claim 1, wherein the crosslinked polyimide has the structure A-P$^1$—R$^2$-A, wherein P$^1$ has the structure:

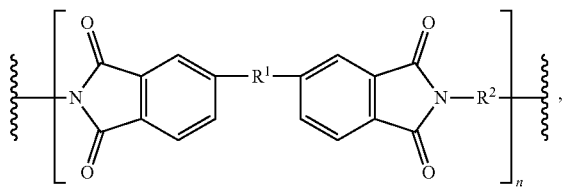

wherein:

at each occurrence, A is selected from the group consisting of:

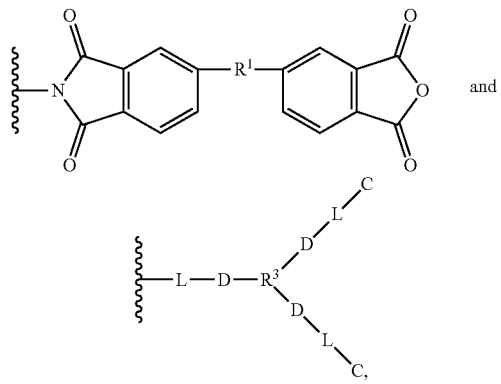

and at each occurrence, C is independently selected from the group consisting of —NH$_2$, -A, and -P$^1$—R$^2$-A, R$^1$ is a bond, R$^2$ is selected from the group consisting of:

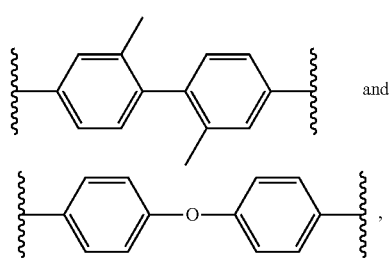

and

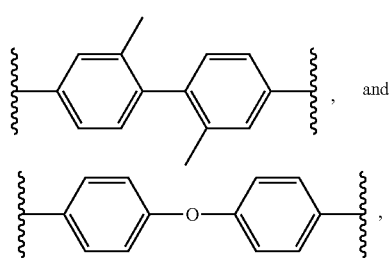

D is —C(O)—NH—, wherein the C(O) of the —C(O)—NH— is closer to R$^3$ than the —NH— of the —C(O)—NH—, at each occurrence, L is independently selected from the group consisting of:

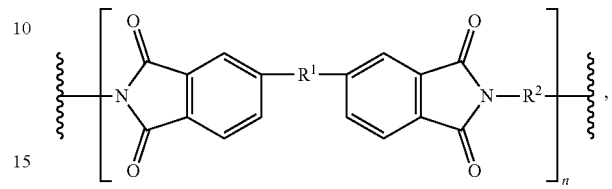

R$^3$ is trivalent phenyl substituted at the 1, 3, and 5-positions by the -D-L-C, and at each occurrence, n is independently 2 to about 100,000,000.

18. A system for performing the method of claim 1, the system comprising:
a tubular disposed in the subterranean formation; and
a pump configured to pump the composition in the subterranean formation through the tubular.

19. A method of treating a subterranean formation, comprising:
placing in secondary fractures in the subterranean formation a proppant having a particle size less than or equal to 100 microns and comprising a crosslinked polyimide having the structure A-P$^1$—R$^2$-A, wherein P$^1$ has the structure:

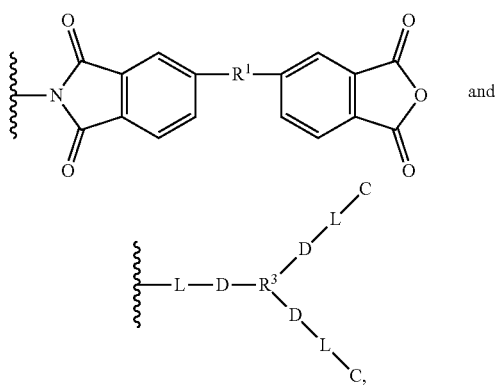

wherein:
at each occurrence, A is selected from the group consisting of:

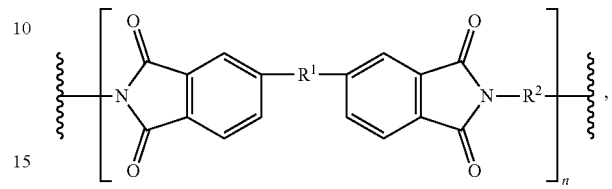

at each occurrence, R$^1$ is independently selected from the group consisting of a bond and —C(O)—, at each occurrence, R$^2$ is independently a substituted or unsubstituted (C$_1$-C$_{20}$)hydrocarbyl interrupted by 0, 1, 2, or 3 groups independently selected from the group consisting of —O—, —S—, and substituted or unsubstituted —NH—, at each occurrence, C is independently selected from the group consisting of —NH$_2$, -A, and -P$^1$—R$^2$-A, at each occurrence, D is independently selected from the group consisting of a bond, —O—, —NH—, —C(O)—O—, and —C(O)—NH—, at each occurrence, L is independently selected from the group consisting of a bond, a substituted or unsubstituted (C$_1$-C$_{20}$)hydrocarbylene interrupted by 0, 1, 2, or 3 groups independently selected from the group consisting of —O—, —S—, and substituted or unsubstituted —NH—, at each occurrence, R$^3$ is independently a trivalent substituted or unsubstituted (C$_1$-C$_{20}$)hydrocarbyl interrupted by 0, 1, 2, or 3 groups independently selected from the group consisting of —O—, —S—, and substituted or unsubstituted —NH—, and at each occurrence, n is independently 2 to about 100,000,000.

20. A method of treating a subterranean formation, comprising:
placing in secondary fractures in the subterranean formation a proppant having a particle size less than or equal to 100 microns and comprising a crosslinked polyimide having the structure A-P$^1$—R$^2$-A, wherein P$^1$ has the structure:

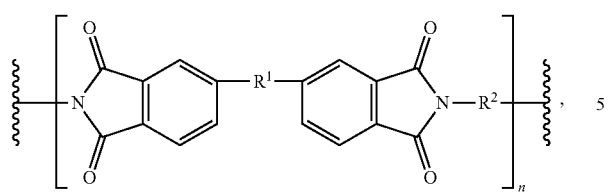

wherein:
at each occurrence, A is selected from the group consisting of:

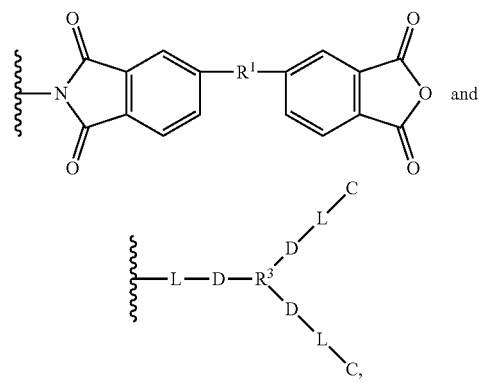

$R^1$ is independently selected from the group consisting of a bond and —C(O)—, $R^2$ is selected from the group consisting of:

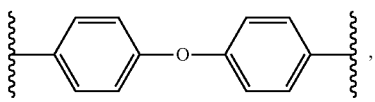

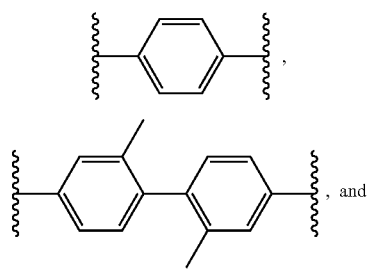

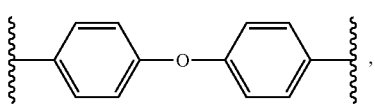

at each occurrence, C is independently selected from the group consisting of —$NH_2$, -A, and -$P^1$—$R^2$-A, D is independently selected from the group consisting of —O— and —C(O)—NH—, at each occurrence, L is independently selected from the group consisting of:

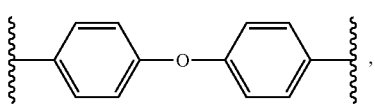

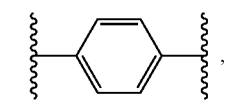

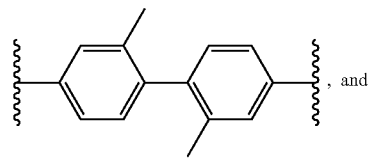

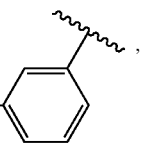

$R^3$ is trivalent phenyl substituted at the 1, 3, and 5-positions by the -D-L-C, and at each occurrence, n is independently 2 to about 100,000,000.

* * * * *